(12) United States Patent
Yamashita

(10) Patent No.: US 6,909,853 B1
(45) Date of Patent: Jun. 21, 2005

(54) APPARATUS FOR TRANSFERRING MONITOR SIGNALS IN PHOTO-TRANSFER SYSTEM

(75) Inventor: Makoto Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/566,388

(22) Filed: May 8, 2000

(30) Foreign Application Priority Data

May 7, 1999 (JP) .......................................... 11-126673

(51) Int. Cl.[7] .............................................. H04B 10/02
(52) U.S. Cl. .......................... 398/177; 398/181; 398/31
(58) Field of Search ................................. 398/177, 181, 398/FOR 168, 30, 31, 160

(56) References Cited

U.S. PATENT DOCUMENTS

| | | | | |
|---|---|---|---|---|
| 3,698,792 A | * | 10/1972 | Kusters | ....................... 359/313 |
| 5,434,701 A | * | 7/1995 | Fatehi et al. | ............. 359/341.4 |
| 6,097,535 A | * | 8/2000 | Terahara | ................. 359/341.41 |
| 6,151,160 A | * | 11/2000 | Ma et al. | ................ 359/337.12 |

FOREIGN PATENT DOCUMENTS

| JP | A 3-214936 | 9/1991 |
|---|---|---|
| JP | 3214936 | 9/1991 |
| JP | A 3-270520 | 12/1991 |
| JP | A 4-306928 | 10/1992 |
| JP | A 4-314223 | 11/1992 |
| JP | A 7-336296 | 12/1995 |
| JP | 9284234 | 10/1997 |

OTHER PUBLICATIONS

English–language translation of JP–4–306928 A (Aida et al.).*

S.H. Yun et al., OFC 1997 Technical Digest TuH3, pp. 30–31.

* cited by examiner

*Primary Examiner*—Jason Chan
*Assistant Examiner*—Christina Y Leung
(74) *Attorney, Agent, or Firm*—Young & Thompson

(57) ABSTRACT

An apparatus for transferring monitor signals, which apparatus receives a primary signal, and a secondary signal for monitoring a wavelength, and outputs the primary signal and the modulated secondary signal. The apparatus includes an optical coupler to which the primary signal is input, a first optical branching filter optically connected to a signal output terminal, a first optical amplifier optically connected in series between the optical coupler and the first optical branching filter, and a first optical band-pass filter optically connected in series between the optical coupler and the first optical branching filter, but optically connected in parallel with the first optical amplifier. The primary signal is input into the optical coupler and output from the signal output terminal through the first optical amplifier and the first optical branching filter. The primary signal is divided into two parts by the first optical branching filter, and one of the two parts is input again into the first optical amplifier through the first optical band-pass filter and the optical coupler. The apparatus makes it possible to generate a monitor signal without employing a laser module.

58 Claims, 17 Drawing Sheets

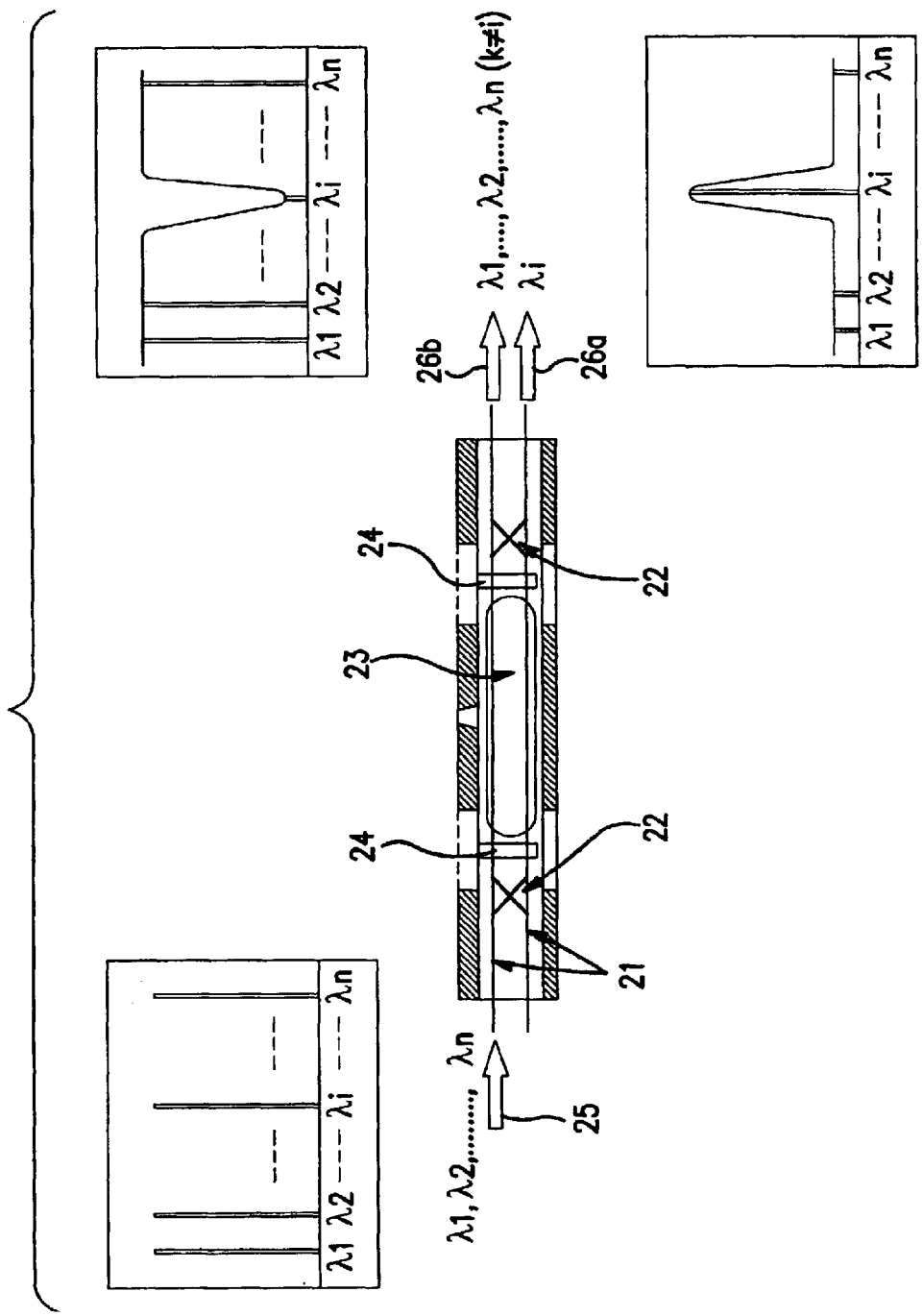

APPARATUS FOR TRANSFERRING MONITOR SIGNALS IN PHOTO-TRANSFER SYSTEM

BACKGROUND OF THE INVENTION

1. Field of the Invention

The invention relates to an apparatus for transferring a monitor signal, to be used in a system for transferring an optical signal.

2. Description of the Related Art

FIG. 1 is a block diagram of a conventional apparatus for transferring a monitor signal, to be used in an optical-signal transferring system.

The apparatus is comprised of an optical branching filter 1, an optical band-pass filter 2, a light receiver 3, a monitor control signal processor 4, a laser driver 5, a laser module 6, an optical coupler 7, and an optical amplifier 8 optically connected in series between the optical branching filter 1 and the optical coupler 7.

The optical band-pass filter 2, the light receiver 3, the monitor control signal processor 4, the laser driver 5, and the laser module 6, are optically connected in series between the optical branching filter 1 and the optical coupler 7, and in parallel with the optical amplifier 8. The monitor control signal processor 4 receives a monitor control signal through a monitor-signal input terminal 11.

The optical branching filter 1 is optically connected to a signal input terminal 9, and the optical coupler 7 is optically connected to a signal output terminal 10.

The apparatus having the above-mentioned structure operates as follows.

An optical multiple signal in which a primary signal having a wavelength of λ s and a secondary signal monitoring a wavelength and having a wavelength of λ sv are multiplexed each other is input into the optical branching filter 1 through the signal input terminal 9. Since the wavelength of λ sv of the secondary signal is out of a gain band width of the optical amplifier 8, the secondary signal is directed to the optical band-pass filter 2 by the optical branching filer 1 upstream of the optical amplifier 8.

The secondary signal is input into the light receiver 3 through the optical band-pass filter 2. The light receiver 3 converts the received secondary signal into an electric signal. The thus produced electric signal is transferred to the monitor control signal processor 4, and processed by the monitor control signal processor 4 together with a monitor control signal input into the monitor control signal processor 4 through the monitor control signal input terminal 11.

The monitor control signal having been processed by the monitor control signal processor 4 is output to the laser driver 5, and then, is modulated in the laser module 6.

The thus modulated monitor control signal is combined at the optical coupler 7 with the primary signal having been amplified in the optical amplifier 8. The thus combined monitor control signal and primary signal is output through the signal output terminal 10.

The above-mentioned apparatus is accompanied with a problem that the apparatus has to include the laser module 6 by the number equal to the number of the optical amplifiers 8. Since the laser module 6 is quite expensive, the apparatus costs too much in fabrication thereof.

For instance, Japanese Unexamined Patent Publications Nos. 3-214936 and 9-284234 have suggested an apparatus for transferring a monitor signal, to be used for an optical repeater. However, the suggested apparatuses include a modulator for modulating an input signal. This means that the suggested apparatuses have the same problem as the problem of the conventional apparatus illustrated in FIG. 1.

SUMMARY OF THE INVENTION

In view of the above-mentioned problem of the conventional apparatus, it is an object of the present invention to provide an apparatus of transferring a monitor signal, which apparatus is capable of transmitting a monitor signal without using a laser module.

There is provided an apparatus for transferring monitor signals, which apparatus receives a primary signal, and a secondary signal for monitoring a wavelength, and outputs the primary signal and the modulated secondary signal, the apparatus including a ring oscillator including an optical amplifier and a first optical band-pass filter, the ring oscillator oscillating wavelengths other than a wavelength of the primary signal in a range of a width of a gain band of the optical amplifier, to thereby modulate the secondary signal.

The apparatus may further include a separator to which the primary and secondary signals are input and which separate the secondary signal from the primary signal, a second optical band-pass filter to which the secondary signal separated by the separator is input, a photoelectric converter optically connected to the second optical band-pass filter, the photoelectric converter converting an optical signal to an electric signal, and a filter driver receiving the electric signal and controlling the first optical band-pass filter such that a primary wavelength among wavelengths of signals passing through the first optical band-pass filter is equal to a wavelength of the secondary signal.

It is preferable that the filter driver varies passing loss in the first optical band-pass filter to thereby modulate an intensity of the secondary signal.

For instance, the first optical band-pass filter may be comprised of an acoustic optical filter.

There is further provided an apparatus for transferring monitor signals, which apparatus receives a primary signal, and a secondary signal for monitoring a wavelength, and outputs the primary signal and the modulated secondary signal, the apparatus including (a) an optical coupler to which the primary signal is input, (b) a first optical branching filter optically connected to a signal output terminal, (c) a first optical amplifier optically connected in series between the optical coupler and the first optical branching filter, and (d) a first optical bandpass filter optically connected in series between the optical coupler and the first optical branching filter, but optically connected in parallel with the first optical amplifier, the primary signal being input into the optical coupler and output from the signal output terminal through the first optical amplifier and the first optical branching filter, the primary signal being divided into two parts by the first optical branching filter, one of the two parts being input again into the first optical amplifier through the first optical band-pass filter and the optical coupler.

The apparatus may further include a second optical amplifier for amplifying the primary signal, the second optical amplifier being located upstream of the first optical amplifier, in which case, it is preferable that the second optical amplifier has a smaller gain band width than that of the first optical amplifier.

The apparatus may further include a second optical amplifier for amplifying both the primary and secondary signals, the second optical amplifier being located upstream of the first optical amplifier, in which case, it is preferable that the second optical amplifier has the same gain band width as that of the first optical amplifier.

The apparatus may further include a separator to which the primary and secondary signals are input and which separate the secondary signal from the primary signal, a second optical band-pass filter to which the secondary signal separated by the separator is input, a photoelectric converter optically connected to the second optical band-pass filter, the photoelectric converter converting an optical signal to an electric signal, and a driver receiving the electric signal and controlling the first optical band-pass filter such that a primary wavelength among wavelengths of signals passing through the first optical band-pass filter is equal to a wavelength of the secondary signal.

For instance, the driver varies passing loss in the first optical band-pass filter to thereby modulate an intensity of the secondary signal.

The apparatus may further include a branching filter which divides the primary and secondary signals into a plurality of signals, a second optical band-pass filter to which at lease one of the divided signals is input, a photoelectric converter optically connected to the second optical band-pass filter, the photoelectric converter converting an optical signal to an electric signal, and a driver receiving the electric signal and controlling the first optical band-pass filter such that a primary wavelength among wavelengths of signals passing through the first optical band-pass filter is equal to a wavelength of the secondary signal.

There is still further provided an apparatus for transferring monitor signals, which apparatus receives a primary signal, and a secondary signal for monitoring a wavelength, and outputs the primary signal and the modulated secondary signal, the apparatus including (a) an optical coupler to which the primary signal is input, (b) a first optical branching filter optically connected to a signal output terminal, (c) a first optical amplifier optically connected in series between the optical coupler and the first optical branching filter, (d) a first optical band-pass filter optically connected in series between the optical coupler and the first optical branching filter, but optically connected in parallel with the first optical amplifier, and (e) an optical attenuator optically connected in series between the optical coupler and the first optical band-pass filter, the primary signal being input into the optical coupler and output from the signal output terminal through the first optical amplifier and the first optical branching filter, the primary signal being divided into two parts by the first optical branching filter, one of the two parts being input again into the first optical amplifier through the first optical band-pass filter, the optical attenuator and the optical coupler.

The apparatus may further include a second optical amplifier for amplifying the primary signal, the second optical amplifier being located upstream of the first optical amplifier, in which case, it is preferable that the second optical amplifier has a smaller gain band width than that of the first optical amplifier.

The apparatus may further include a second optical amplifier for amplifying both the primary and secondary signals, the second optical amplifier being located upstream of the first optical amplifier, in which case, it is preferable that the second optical amplifier has the same gain band width as that of the first optical amplifier.

The apparatus may further include a separator to which the primary and secondary signals are input and which separate the secondary signal from the primary signal, a second optical band-pass filter to which the secondary signal separated by the separator is input, a photoelectric converter optically connected to the second optical band-pass filter, the photoelectric converter converting an optical signal to an electric signal, and a driver receiving the electric signal and controlling the optical attenuator such that a primary wavelength among wavelengths of signals passing through the optical attenuator is equal to a wavelength of the secondary signal.

For instance, the driver varies attenuation of the optical attenuator to thereby modulate an intensity of the secondary signal.

The apparatus may further include a branching filter which divides the primary and secondary signals into a plurality of signals, a second optical band-pass filter to which at lease one of the divided signals is input, a photoelectric converter optically connected to the second optical band-pass filter, the photoelectric converter converting an optical signal to an electric signal, and a driver receiving the electric signal and controlling the optical attenuator such that a primary wavelength among wavelengths of signals passing through the optical attenuator is equal to a wavelength of the secondary signal.

There is yet further provided an apparatus for transferring monitor signals, which apparatus receives a primary signal, and a secondary signal for monitoring a wavelength, and outputs the primary signal and the modulated secondary signal, the apparatus including (a) an optical coupler to which the primary signal is input, (b) a first optical branching filter optically connected to a signal output terminal, (c) a first optical amplifier optically connected in series between the optical coupler and the first optical branching filter, (d) a first optical band-pass filter optically connected in series between the optical coupler and the first optical branching filter, but optically connected in parallel with the first optical amplifier, and (e) an optical switch optically connected in series between the optical coupler and the first optical band-pass filter, the primary signal being input into the optical coupler and output from the signal output terminal through the first optical amplifier and the first optical branching filter, the primary signal being divided into two parts by the first optical branching filter, one of the two parts being input again into the first optical amplifier through the first optical band-pass filter, the optical switch and the optical coupler.

The apparatus may further include a second optical amplifier for amplifying the primary signal, the second optical amplifier being located upstream of the first optical amplifier, in which case, it is preferable that the second optical amplifier has a smaller gain band width than that of the first optical amplifier.

The apparatus may further include a second optical amplifier for amplifying both the primary and secondary signals, the second optical amplifier being located upstream of the first optical amplifier, in which case, it is preferable that the second optical amplifier has the same gain band width as that of the first optical amplifier.

The apparatus may further include a separator to which the primary and secondary signals are input and which separate the secondary signal from the primary signal, a second optical band-pass filter to which the secondary signal separated by the separator is input, a photoelectric converter optically connected to the second optical band-pass filter, the photoelectric converter converting an optical signal to an electric signal, and a driver receiving the electric signal and controlling the optical switch such that a primary wavelength among wavelengths of signals passing through the optical switch is equal to a wavelength of the secondary signal.

For instance, the driver turns the optical switch on or off to thereby modulate an intensity of the secondary signal.

The apparatus may further include a branching filter which divides the primary and secondary signals into a plurality of signals, a second optical band-pass filter to which at lease one of the divided signals is input, a photoelectric converter optically connected to the second optical band-pass filter, the photoelectric converter converting an optical signal to an electric signal, and a driver receiving the electric signal and controlling the optical switch such that a primary wavelength among wavelengths of signals passing through the optical switch is equal to a wavelength of the secondary signal.

There is still yet further provided an apparatus for transferring monitor signals, which apparatus receives a primary signal, and a secondary signal for monitoring a wavelength, and outputs the primary signal and the modulated secondary signal, the apparatus including (a) a first optical coupler to which the primary signal is input, (b) a first optical branching filter optically connected to a signal output terminal, (c) a first optical amplifier optically connected in series between the first optical coupler and the first optical branching filter, (d) a second optical branching filter optically connected in series between the first optical coupler and the first optical branching filter, but optically connected in parallel with the first optical amplifier, (e) a second optical coupler optically connected in series between the second optical branching filter and the first optical coupler, and (f) first to N-th optical band-pass filters optically connected in series between the second optical branching filter and the second optical coupler, and optically connected in parallel with one another wherein N is an integer equal to or greater than 2, the primary signal being input into the first optical coupler and output from the signal output terminal through the first optical amplifier and the first. optical branching filter, the primary signal being divided into two parts by the first optical branching filter, one of the two parts being input again into the first optical amplifier through the second optical branching filter, the first to N-th optical band-pass filters and the second optical coupler.

The apparatus may further include a second optical amplifier for amplifying the primary signal, the second optical amplifier being located upstream of the first optical amplifier, in which case, it is preferable that the second optical amplifier has a smaller gain band width than that of the first optical amplifier.

The apparatus may further include a second optical amplifier for amplifying both the primary and secondary signals, the second optical amplifier being located upstream of the first optical amplifier, in which case, it is preferable that the second optical amplifier has the same gain band width as that of the first optical amplifier.

The apparatus may further include a separator to which the primary and secondary signals are input and which separate the secondary signal from the primary signal, a third branching filter to which the secondary signal separated by the separator is input and which divides the thus input secondary signal into N signals, N optical band-pass filters to each of which each of the N signals is input, N photoelectric converters each optically connected to each of the N optical band-pass filters, the photoelectric converter converting an optical signal to an electric signal, and a driver receiving the electric signals and controlling the first to N-th optical band-pass filters such that a primary wavelength among wavelengths of signals passing through each of the first to N-th optical band-pass filters is equal to a wavelength of each of the N signals.

For instance, the driver varies passing loss in each of the first to N-th optical band-pass filters to thereby modulate an intensity of each of the N signals.

The apparatus may further include a fourth branching filter which divides the primary and secondary signals into a plurality of signals, a third branching filter to which the secondary signal divided by the fourth branching filter is input and which divides the thus input secondary signal into N signals, N optical band-pass filters to each of which each of the N signals is input, a photoelectric converter optically connected to each of the N optical band-pass filters, the photoelectric converter converting an optical signal to an electric signal, and a driver receiving the electric signals and controlling the first to N-th optical band-pass filters such that a primary wavelength among wavelengths of signals passing through each of the first to N-th optical band-pass filters is equal to a wavelength of each of the N signals.

There is further provided an apparatus for transferring monitor signals, which apparatus receives a primary signal, and a secondary signal for monitoring a wavelength, and outputs the primary signal and the modulated secondary signal, the apparatus including (a) a first optical coupler to which the primary signal is input, (b) a first optical branching filter optically connected to a signal output terminal, (c) a first optical amplifier optically connected in series between the first optical coupler and the first optical branching filter, (d) a second optical branching filter optically connected in series between the first optical coupler and the first optical branching filter, but optically connected in parallel with the first optical amplifier, (e) a second optical coupler optically connected in series between the second optical branching filter and the first optical coupler, (f) first to N-th optical band-pass filters optically connected in series between the second optical branching filter and the second optical coupler, and optically connected in parallel with one another wherein N is an integer equal to or greater than 2, and (g) an optical attenuator optically connected in series between the second optical coupler and the first to N-th optical band-pass filters, the primary signal being input into the first optical coupler and output from the signal output terminal through the first optical amplifier and the first optical branching filter, the primary signal being divided into two parts by the first optical branching filter, one of the two parts being input again into the first optical amplifier through the second optical branching filter, the first to N-th optical band-pass filters, the optical attenuator and the second optical coupler.

The apparatus may further include a second optical amplifier for amplifying the primary signal, the second optical amplifier being located upstream of the first optical amplifier, in which case, it is preferable that the second optical amplifier has a smaller gain band width than that of the first optical amplifier.

The apparatus may further include a second optical amplifier for amplifying both the primary and secondary signals, the second optical amplifier being located upstream of the first optical amplifier, in which case, it is preferable that the second optical amplifier has the same gain band width as that of the first optical amplifier.

The apparatus may further include a separator to which the primary and secondary signals are input and which separate the secondary signal from the primary signal, a third branching filter to which the secondary signal separated by the separator is input and which divides the thus input secondary signal into N signals, N optical band-pass filters to each of which each of the N signals is input, N photoelectric converters each optically connected to each of the N optical band-pass filters, the photoelectric converter converting an optical signal to an electric signal, and a driver receiving the electric signals and controlling the optical attenuator such that a primary wavelength among wavelengths of signals passing through each of the first to N-th optical band-pass filters is equal to a wavelength of each of the N signals.

For instance, the driver varies attenuation of the optical attenuator to thereby modulate an intensity of the secondary signal.

The apparatus may further include a fourth branching filter which divides the primary and secondary signals into a plurality of signals, a third branching filter to which the secondary signal divided by the fourth branching filter is input and which divides the thus input secondary signal into N signals, N optical band-pass filters to each of which each of the N signals is input, a photoelectric converter optically connected to each of the N optical band-pass filters, the photoelectric converter converting an optical signal to an electric signal, and a driver receiving the electric signals and controlling the optical attenuator such that a primary wavelength among wavelengths of signals passing through each of the first to N-th optical band-pass filters is equal to a wavelength of each of the N signals.

There is further provided an apparatus for transferring monitor signals, which apparatus receives a primary signal, and a secondary signal for monitoring a wavelength, and outputs the primary signal and the modulated secondary signal, the apparatus including (a) a first optical coupler to which the primary signal is input, (b) a first optical branching filter optically connected to a signal output terminal, (c) a first optical amplifier optically connected in series between the first optical coupler and the first optical branching filter, (d) a second optical branching filter optically connected in series between the first optical coupler and the first optical branching filter, but optically connected in parallel with the first optical amplifier, (e) a second optical coupler optically connected in series between the second optical branching filter and the first optical coupler, (f) first to N-th optical band-pass filters optically connected in series between the second optical branching filter and the second optical coupler, and optically connected in parallel with one another wherein N is an integer equal to or greater than 2, and (g) an optical switch optically connected in series between the second optical coupler and the first to N-th optical band-pass filters, the primary signal being input into the first optical coupler and output from the signal output terminal through the first optical amplifier and the first optical branching filter, the primary signal being divided into two parts by the first optical branching filter, one of the two parts being input again into the first optical amplifier through the second optical branching filter, the first to N-th optical band-pass filters, the optical switch and the second optical coupler.

The apparatus may further include a second optical amplifier for amplifying the primary signal, the second optical amplifier being located upstream of the first optical amplifier, in which case, it is preferable that the second optical amplifier has a smaller gain band width than that of the first optical amplifier.

The apparatus may further include a second optical amplifier for amplifying both the primary and secondary signals, the second optical amplifier being located upstream of the first optical amplifier, in which case, it is preferable that the second optical amplifier has the same gain band width as that of the first optical amplifier.

The apparatus may further include a separator to which the primary and secondary signals are input and which separate the secondary signal from the primary signal, a third branching filter to which the secondary signal separated by the separator is input and which divides the thus input secondary signal into N signals, N optical band-pass filters to each of which each of the N signals is input, N photoelectric converters each optically connected to each of the N optical band-pass filters, the photoelectric converter converting an optical signal to an electric signal, and a driver receiving the electric signals and controlling the optical switch such that a primary wavelength among wavelengths of signals passing through each of the first to N-th optical band-pass filters is equal to a wavelength of each of the N signals.

For instance, the driver turns the optical switch on or off to thereby modulate an intensity of the secondary signal.

The apparatus may further include a fourth branching filter which divides the primary and secondary signals into a plurality of signals, a third branching filter to which the secondary signal divided by the fourth branching filter is input and which divides the thus input secondary signal into N signals, N optical band-pass filters to each of which each of the N signals is input, a photoelectric converter optically connected to each of the N optical band-pass filters, the photoelectric converter converting an optical signal to an electric signal, and a driver receiving the electric signals and controlling the optical switch such that a primary wavelength among wavelengths of signals passing through each of the first to N-th optical band-pass filters is equal to a wavelength of each of the N signals.

The advantages obtained by the aforementioned present invention will be described hereinbelow.

The conventional apparatus illustrated in FIG. 1 has to include a laser module by the number equal to the number of an optical amplifier. In contrast, the present invention makes it no longer necessary for an apparatus of transferring a monitor signal to include a laser module, ensuring simplification in a structure of the apparatus and reduction in fabrication cost.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 4 illustrates an example of a structure of an acoustic optical filter.

DESCRIPTION OF THE PREFERRED EMBODIMENTS

Preferred embodiments in accordance with the present invention will be explained hereinbelow with reference to drawings.

[First Embodiment]

Figure 2:
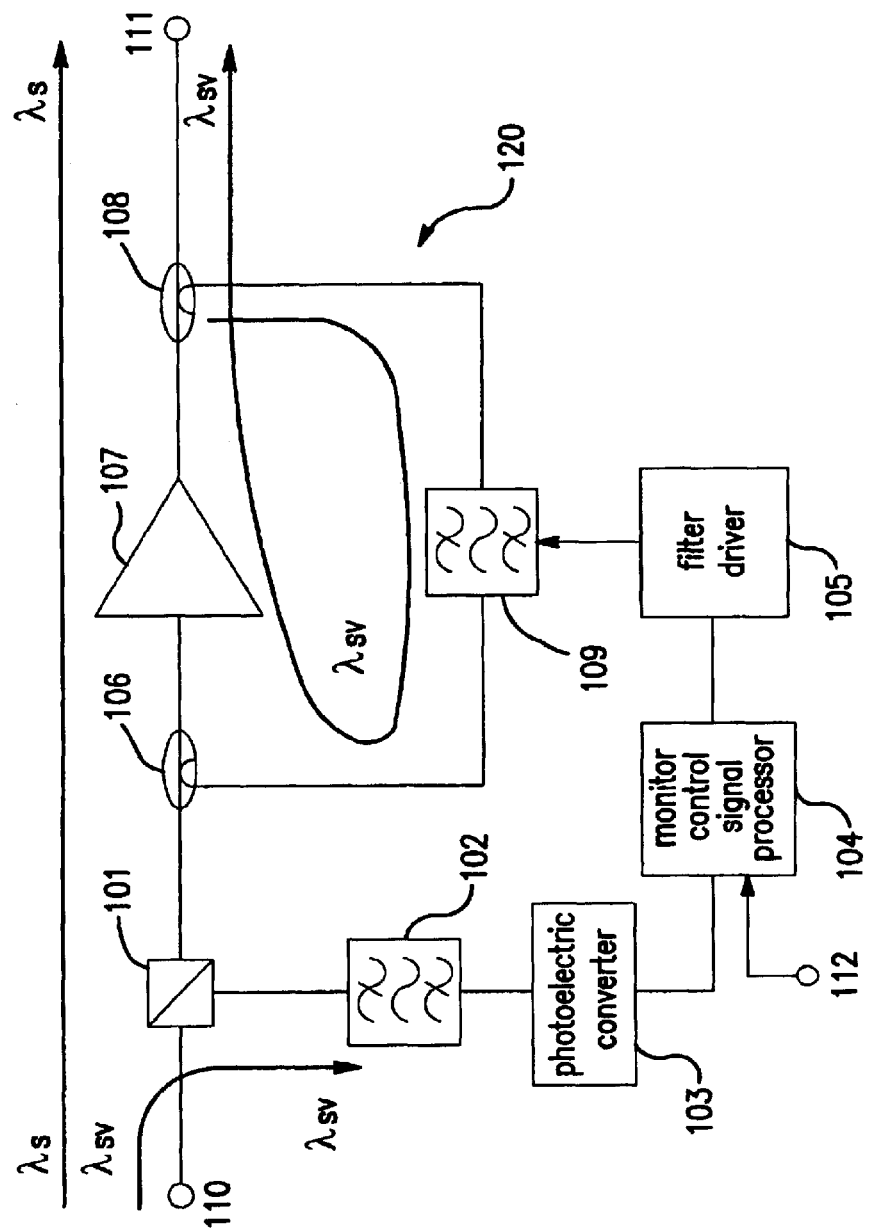
FIG. 2 is a block diagram of an apparatus of transferring a monitor signal, in accordance with the first embodiment of the present invention.

FIG. 2 is a block diagram of an apparatus of transferring a monitor signal, in accordance with the first embodiment.

The apparatus is comprised of a signal input terminal 110 receiving an optical signal comprised of a primary signal having a wavelength of λ s which signal is multiplexed with a secondary signal having a wavelength of λ sv, a wavelength division multiplex (WDM) filter 101 as a separator for separating the secondary signal from the optical multiple signal transmitted through the signal input terminal 110, a second optical band-pass filter 102 to which the secondary signal separated in the WDM filter 101 is input, a photoelectric converter 103 which converts the optical signal transmitted from the second optical band-pass filter 102, into an electric signal, a monitor control signal processor 104 which processes the electric signal transmitted from the photoelectric converter 103, together with a monitor control signal input thereinto through a monitor control signal input terminal 112, a filter driver 105 receiving the monitor control signal transmitted from the monitor control signal processor 104 and controlling a later mentioned first optical band-pass filter 109 such that a primary wavelength among wavelengths of signals passing through the first optical band-pass filter 109 is equal to a wavelength λ sv of the secondary signal, a ring oscillator 120, and a signal output terminal 111 optically connected to an output of the ring oscillator 120.

The ring oscillator 120 is comprised of an optical coupler 106 to which the primary signal separated by the WDM filter 101 is input, a first optical branching filter 108 optically connected to the signal output terminal 111, a first optical amplifier 107 optically connected in series between the optical coupler 106 and the first optical branching filter 108, and a first optical band-pass filter 109 optically connected in series between the optical coupler 106 and the first optical branching filter 108, but optically connected in parallel with the first optical amplifier 107.

The monitor-signal transferring apparatus in accordance with the first embodiment operates as follows.

An optical multiple signal comprised of the primary signal having a wavelength of λ s which is multiplexed with the secondary signal having a wavelength of λ sv is input into the WDM filter 101 through the signal input terminal 110.

The optical multiple signal is separated into the primary and secondary signals in the WDM filter 101.

The primary signal having a wavelength of λ s is input into the first optical amplifier 107 through the optical coupler 106 from the WDM filter 101, and amplified by the first optical amplifier 107. The thus amplified primary signal is output to the signal output terminal 111 through the first optical branching filter 108.

The primary signal is divided into two parts in the first optical branching filter 108, and one of the two parts is input again into the first optical amplifier 107 through the first optical band-pass filter 109 and the optical coupler 106. Namely, the ring oscillator 120 defines a fiber laser.

A fiber laser is detailed in OFC '97 Technical Digest TuH3, S. H. Yun et al..

It is possible to transmit an output optical signal having a wavelength of λ sv, by setting a primary wavelength among wavelengths of signals passing through the first optical band-pass filter 109 to be equal to a wavelength λ sv of the monitor control signal.

Figure 3:
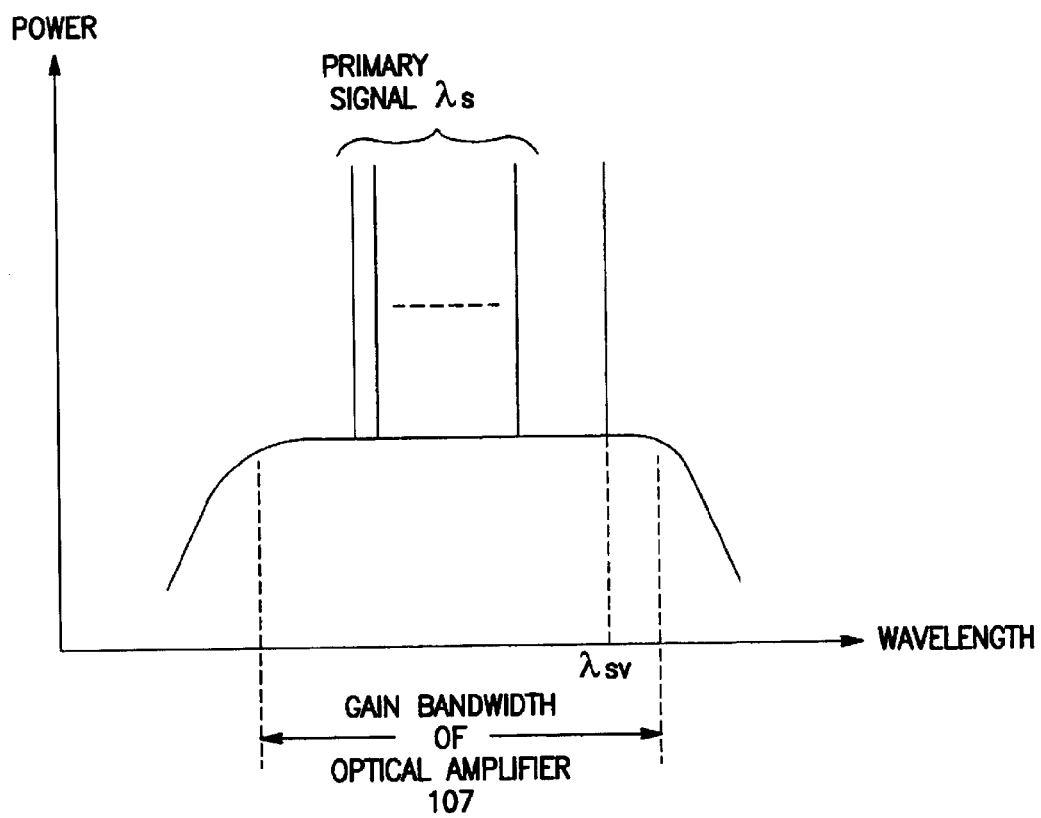
FIG. 3 is a graph showing a relation between a gain bandwidth of an optical amplifier and wavelengths $\lambda$ s and $\lambda$ sv of primary and secondary signals in the first embodiment.

As illustrated in FIG. 3, the wavelength λ sv of the secondary signal is different from the wavelength λ s of the primary signal, and is selected so as not to influence the primary signals having the wavelength λ s which is in the range of a gain band width of the first optical amplifier 107.

The secondary signal having the wavelength λ sv, separated from the primary signal in the WDM filter 101, is input into the photoelectric converter 103 through the second optical band-pass filter 102, and then, is converted into an electric signal by the photoelectric converter 103.

The electric signal is processed in the monitor control signal processor 104 together with a monitor control signal input thereinto through the monitor control signal input terminal 112. The thus processed electric signal is transmitted into the filter driver 105 as a newly produced monitor control signal.

The filter driver 105 varies passing loss in the first optical band-pass filter 109 to thereby modulate an intensity of the monitor control signal having the wavelength λ sv.

The first optical band-pass filter 109 is comprised of, for instance, an acoustic optical filter.

FIG. 4 illustrates an example of a structure of an acoustic optical filter.

The illustrated acoustic optical filter is comprised of optical waveguides 21, polarization beam splitters 22, acoustic-optic mode converters 23, and SAW transducers 24, which are all formed on a substrate composed of LiNO₃. The acoustic optical filter is designed to have two inputs and two outputs.

In the acoustic optical filter illustrated in FIG. 4, when an optical signal 25 comprised of multiplexed signals having wavelengths in the range of $\lambda 1$ to $\lambda n$ is input to an signal input terminal, and a frequency of about 170 MHz is applied to the electrodes 24, there would be obtained a first output or filtered output 26a having a wavelength of $\lambda i$ in accordance with the applied frequency, and a second output or unfiltered output 26b having a wavelength other than the wavelength of $\lambda i$.

In the acoustic optical filter illustrated in FIG. 4, the input optical signal 25 is separated into TE waves and TM waves by the polarization beam splitter 22, and the specific wavelength component $\lambda i$ associated with a frequency applied to the electrodes 24 is converted to TE waves from TM waves, or to TM waves from TE waves. Then, these TE and TM waves are separated again by the polarization beam splitter 22 into wavelength component $\lambda i$ and wavelength components other than the wavelength component $\lambda i$.

Figure 5A:
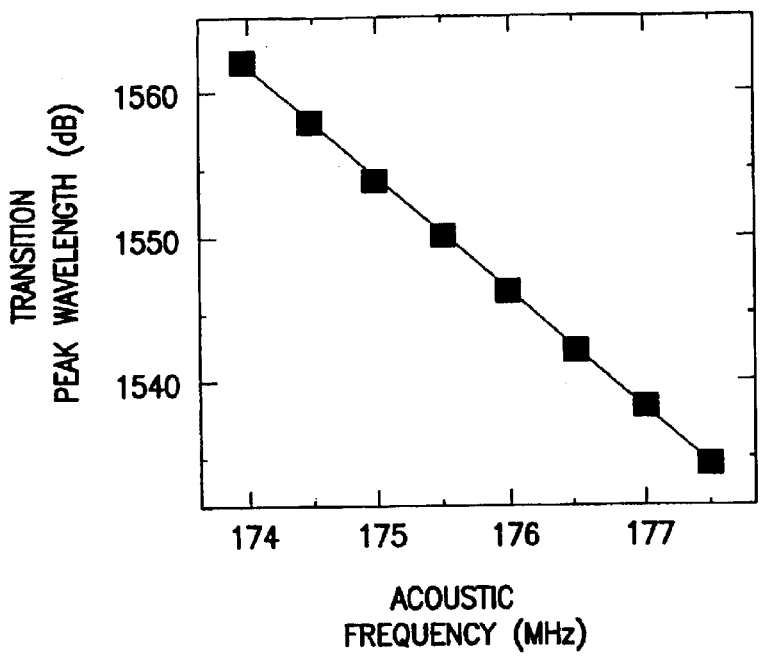
FIG. 5A is a graph showing a characteristic of the acoustic optical filter illustrated in FIG. 4.
Figure 5B:
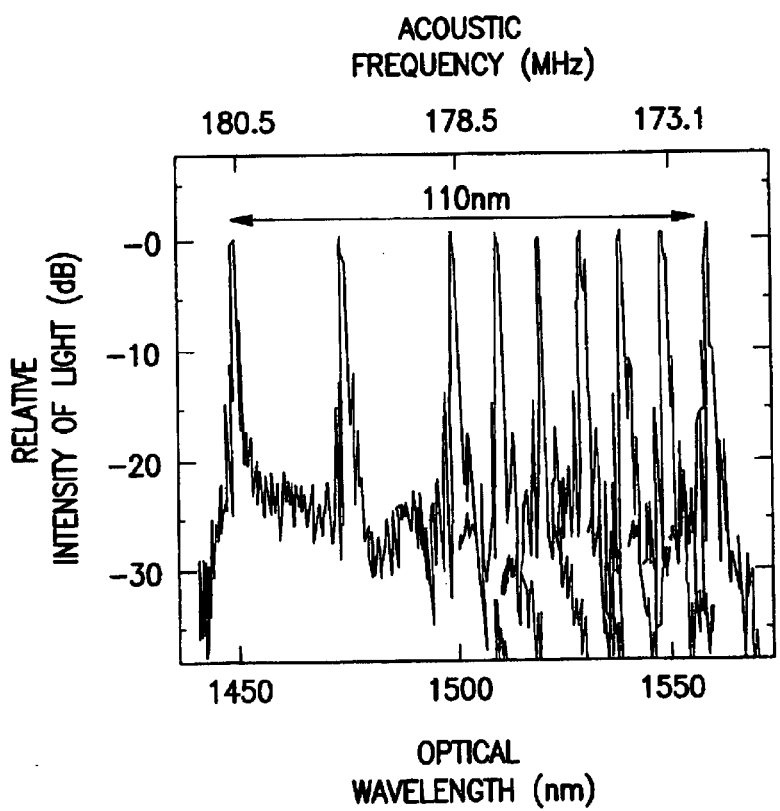
FIG. 5B is a graph showing a characteristic of the acoustic optical filter illustrated in FIG. 4.

FIGS. 5A and 5B illustrate characteristics of the acoustic optical filter illustrated in FIG. 4. As will be understood in view of FIGS. 5A and 5B, it would be possible to modulate an intensity of an optical signal having a wavelength of $\lambda$ sv, by selecting such a high-frequency signal in the filter driver 105 that a primary wavelength among wavelengths of signals passing through the acoustic optical filter is equal to the wavelength $\lambda$ sv of the secondary signal, and turning the selected high-frequency signal on and off.

Figure 1:
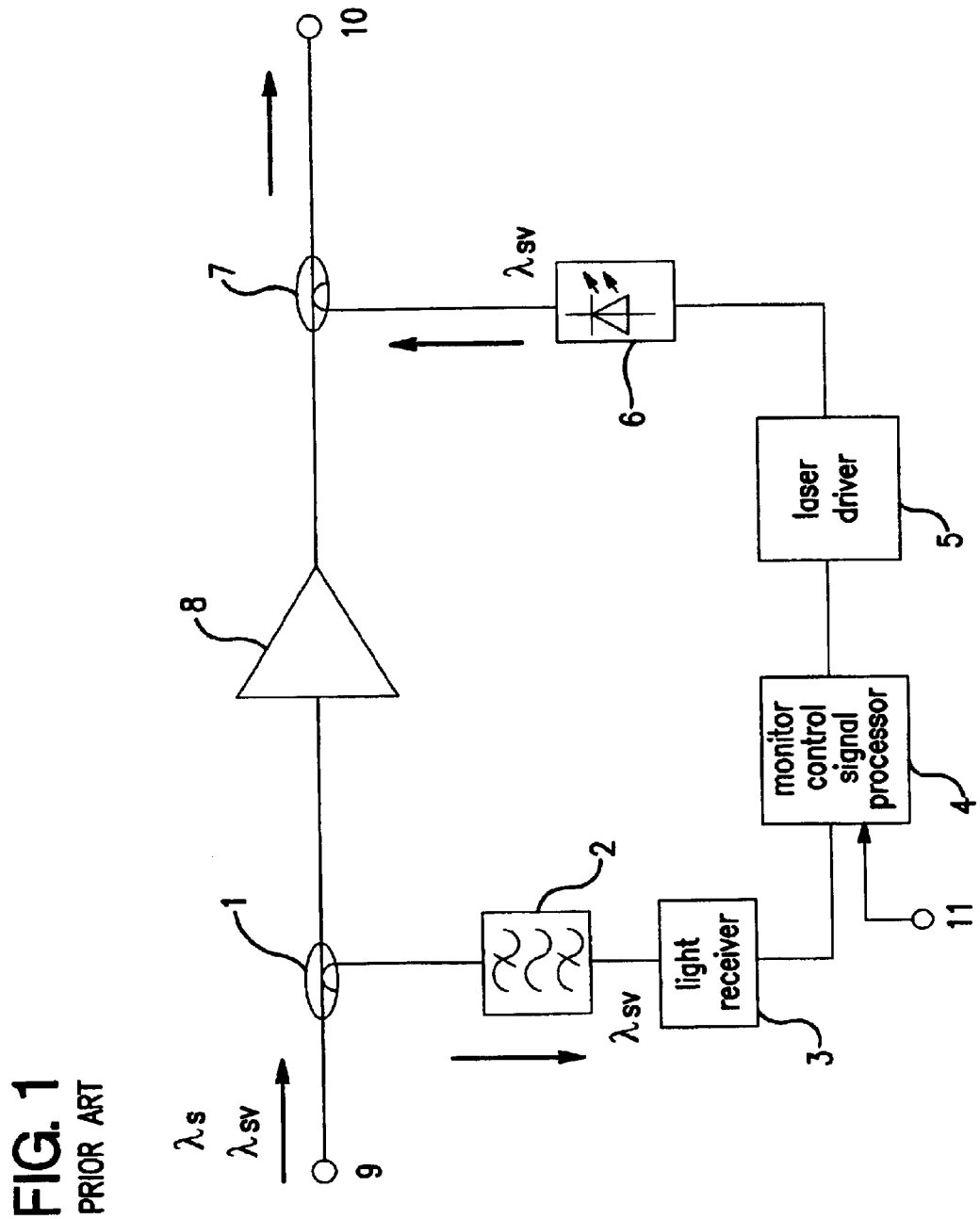
FIG. 1 is a block diagram of a conventional apparatus of transferring a monitor signal.

The conventional apparatus illustrated in FIG. 1 had to include the laser module 6 by the number equal to the number of the optical amplifiers 8. In contrast, the apparatus of transferring a monitor signal, in accordance with the first embodiment, makes it no longer necessary to include a laser module, ensuring simplification of a structure of the apparatus and reduction in fabrication cost.

[Second Embodiment]

Figure 6:
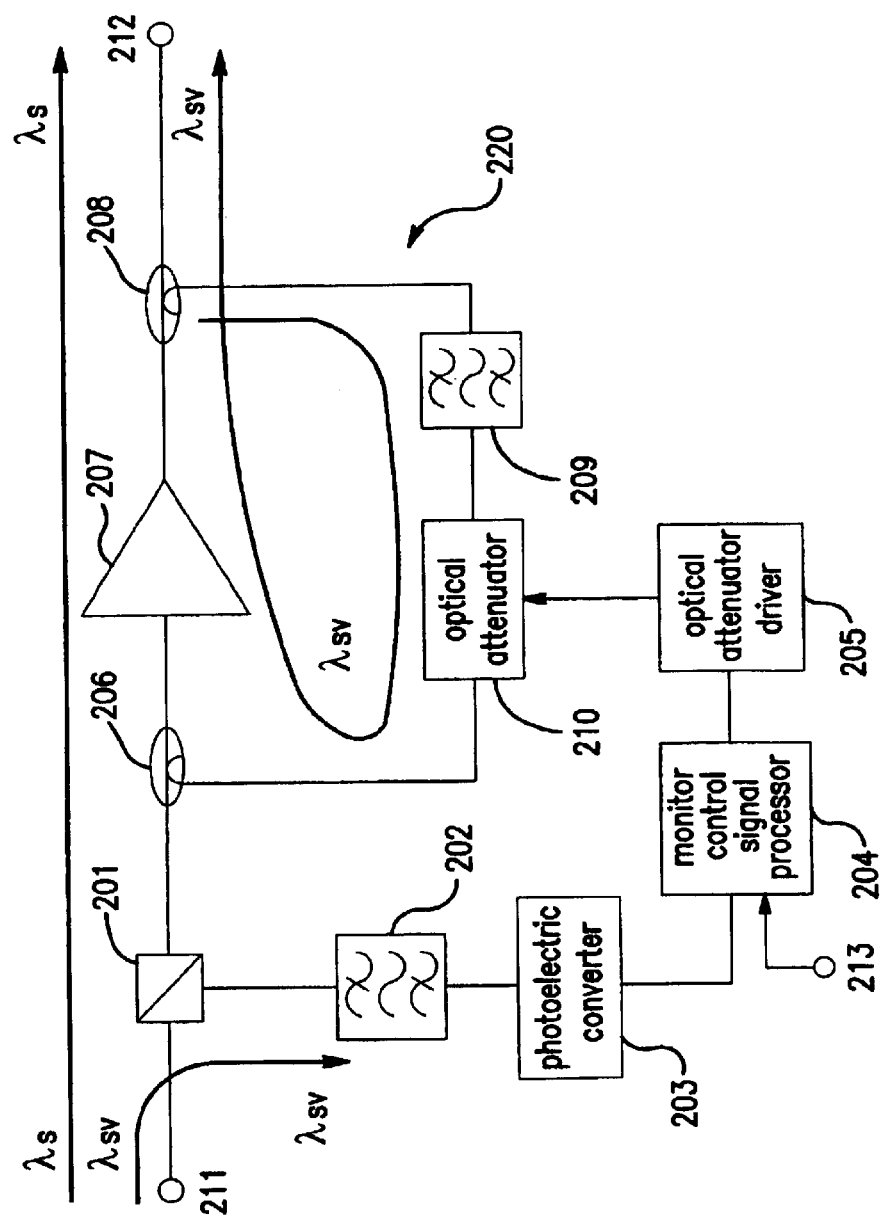
FIG. 6 is a block diagram of an apparatus of transferring a monitor signal, in accordance with the second embodiment of the present invention.

FIG. 6 is a block diagram of an apparatus of transferring a monitor signal, in accordance with the second embodiment.

The apparatus is comprised of a signal input terminal 211 receiving an optical signal comprised of a primary signal having a wavelength of $\lambda$ s which signal is multiplexed with a secondary signal having a wavelength of $\lambda$ sv, a wavelength division multiplex (WDM) filter 201 as a separator for separating the secondary signal from the optical multiple signal transmitted through the signal input terminal 211, a second optical band-pass filter 202 to which the secondary signal separated in the WDM filter 201 is input, a photoelectric converter 203 which converts the optical signal transmitted from the second optical band-pass filter 202, into an electric signal, a monitor control signal processor 204 which processes the electric signal transmitted from the photoelectric converter 203, together with a monitor control signal input thereinto through a monitor control signal input terminal 213, a optical attenuator driver 205 receiving the monitor control signal transmitted from the monitor control signal processor 204 and controlling a later mentioned optical attenuator 210 such that a primary wavelength among wavelengths of signals passing through the first optical band-pass filter 209 is equal to a wavelength $\lambda$ sv of the secondary signal, a ring oscillator 220, and a signal output terminal 212 optically connected to an output of the ring oscillator 220.

The ring oscillator 220 is comprised of an optical coupler 206 to which the primary signal separated by the WDM filter 201 is input, a first optical branching filter 208 optically connected to the signal output terminal 212, a first optical amplifier 207 optically connected in series between the optical coupler 206 and the first optical branching filter 208, a first optical band-pass filter 209 optically connected in series between the optical coupler 206 and the first optical branching filter 208, but optically connected in parallel with the first optical amplifier 207, and an optical attenuator 210 optically connected in series between the optical coupler 206 and the first optical band-pass filter 209.

The monitor-signal transferring apparatus in accordance with the second embodiment operates in the same way as the apparatus in accordance with the first embodiment except an operation of the optical attenuator 210.

The electric signal is processed in the monitor control signal processor 204 together with a monitor control signal input thereinto through the monitor control signal input terminal 213. The thus processed electric signal is transmitted into the optical attenuator driver 205 as a newly produced monitor control signal.

The optical attenuator driver 205 varies attenuation in the optical attenuator 210 to thereby modulate an intensity of the monitor control signal having the wavelength $\lambda$ sv.

The conventional apparatus illustrated in FIG. 1 had to include the laser module 6 by the number equal to the number of the optical amplifiers 8. In contrast, the apparatus of transferring a monitor signal, in accordance with the second embodiment, makes it no longer necessary to include a laser module, ensuring simplification of a structure of the apparatus and reduction in fabrication cost.

[Third Embodiment]

Figure 7:
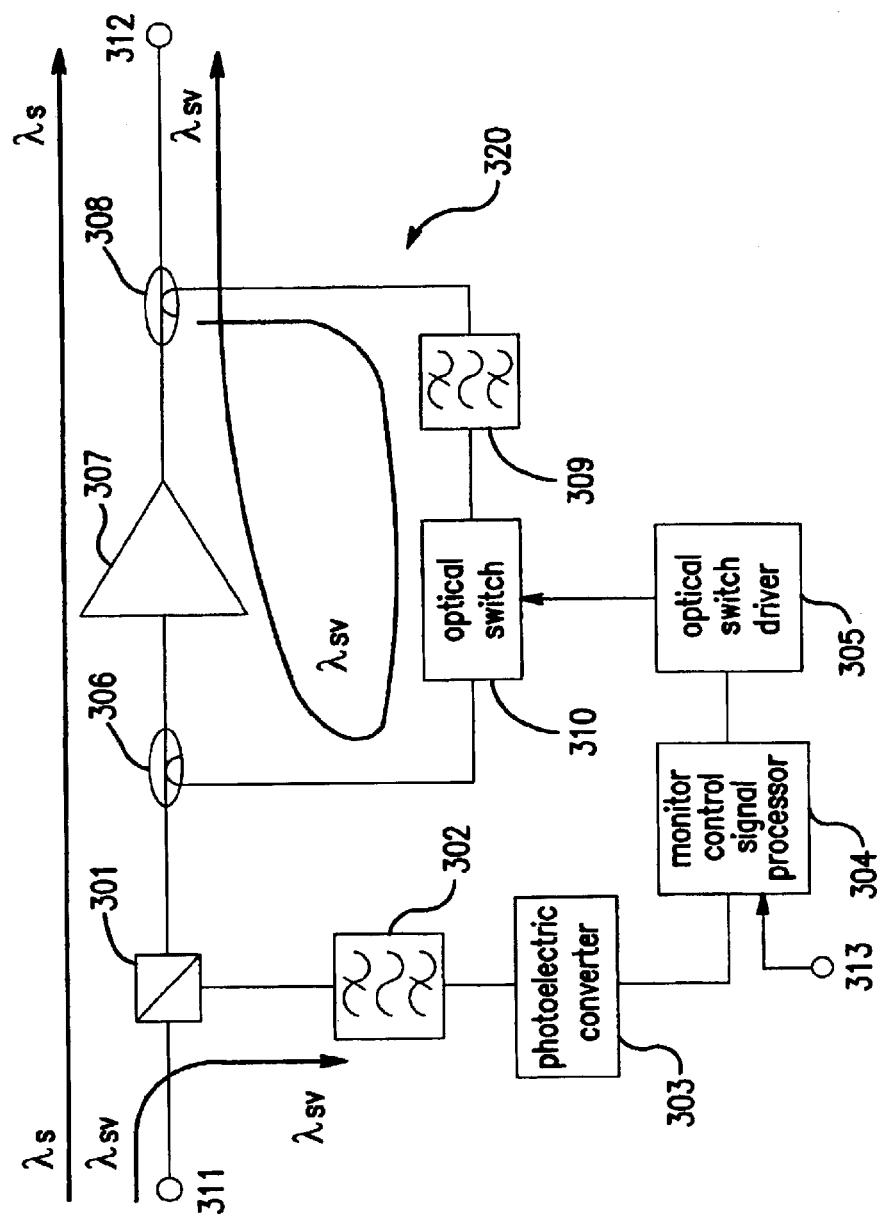
FIG. 7 is a block diagram of an apparatus of transferring a monitor signal, in accordance with the third embodiment of the present invention.

FIG. 7 is a block diagram of an apparatus of transferring a monitor signal, in accordance with the third embodiment.

The apparatus is comprised of a signal input terminal 311 receiving an optical signal comprised of a primary signal having a wavelength of $\lambda$ s which signal is multiplexed with a secondary signal having a wavelength of $\lambda$ sv, a wavelength division multiplex (WDM) filter 301 as a separator for separating the secondary signal from the optical multiple signal transmitted through the signal input terminal 311, a second optical band-pass filter 302 to which the secondary signal separated in the WDM filter 301 is input, a photoelectric converter 303 which converts the optical signal transmitted from the second optical band-pass filter 302, into an electric signal, a monitor control signal processor 304 which processes the electric signal transmitted from the photoelectric converter 303, together with a monitor control signal input thereinto through a monitor control signal input terminal 313, a optical switch driver 305 receiving the monitor control signal transmitted from the monitor control signal processor 304 and controlling a later mentioned optical switch 310 such that a primary wavelength among wavelengths of signals passing through the first optical band-pass filter 309 is equal to a wavelength $\lambda$ sv of the secondary signal, a ring oscillator 320, and a signal output terminal 312 optically connected to an output of the ring oscillator 320.

The ring oscillator 320 is comprised of an optical coupler 306 to which the primary signal separated by the WDM filter 301 is input, a first optical branching filter 308 optically connected to the signal output terminal 312, a first optical amplifier 307 optically connected in series between the optical coupler 306 and the first optical branching filter 308, a first optical band-pass filter 309 optically connected in series between the optical coupler 306 and the first optical branching filter 308, but optically connected in parallel with the first optical amplifier 307, and an optical switch 310 optically connected in series between the optical coupler 306 and the first optical band-pass filter 309.

The monitor-signal transferring apparatus in accordance with the third embodiment operates in the same way as the apparatus in accordance with the first embodiment except an operation of the optical switch 310.

The electric signal is processed in the monitor control signal processor 304 together with a monitor control signal input thereinto through the monitor control signal input terminal 313. The thus processed electric signal is transmitted into the optical switch driver 305 as a newly produced monitor control signal.

The optical switch driver 305 turns the optical switch 310 on and off to thereby modulate an intensity of the monitor control signal having the wavelength λ sv.

The conventional apparatus illustrated in FIG. 1 had to include the laser module 6 by the number equal to the number of the optical amplifiers 8. In contrast, the apparatus of transferring a monitor signal, in accordance with the third embodiment, makes it no longer necessary to include a laser module, ensuring simplification of a structure of the apparatus and reduction in fabrication cost.

[Fourth Embodiment]

Figure 8:
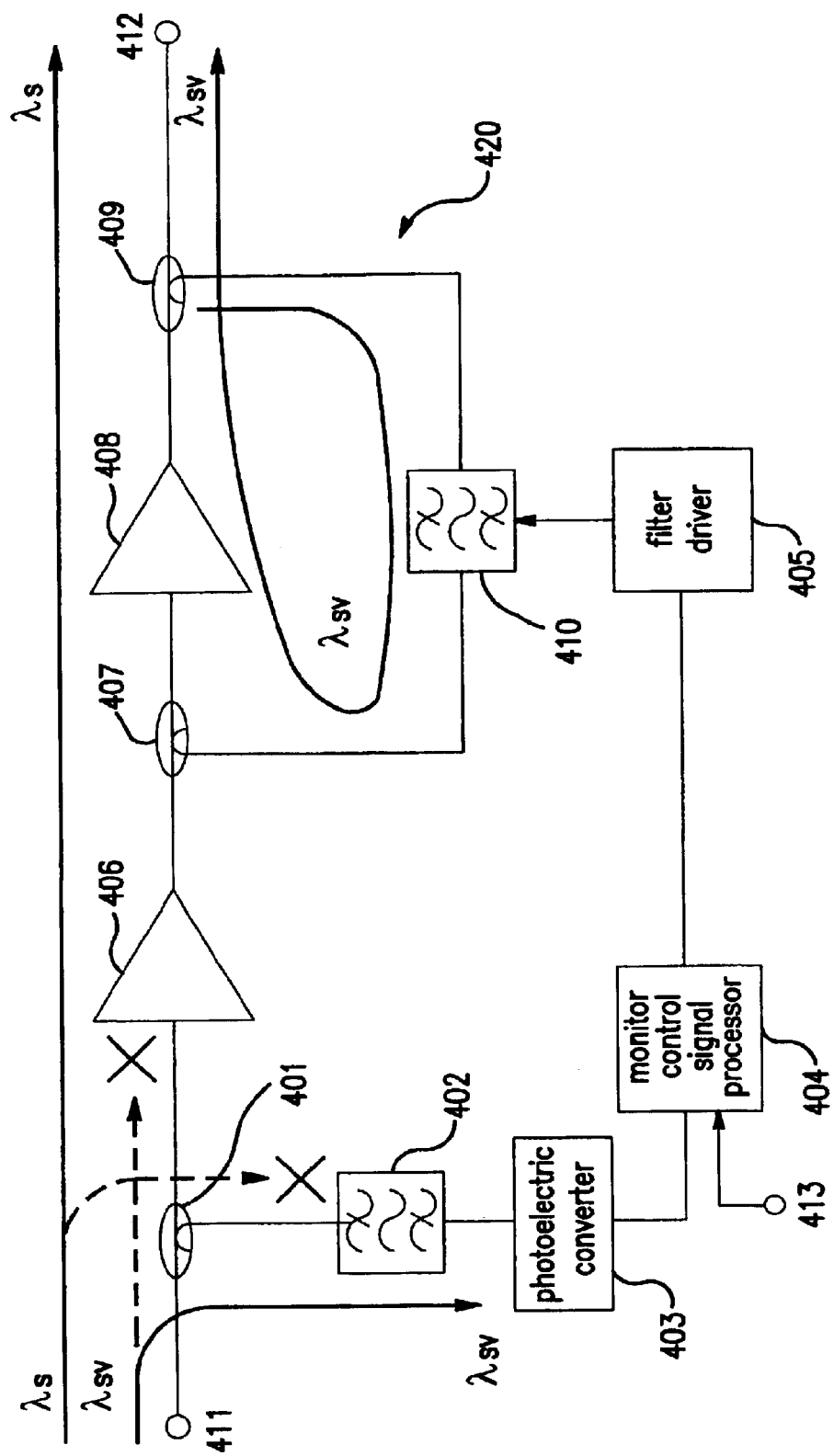
FIG. 8 is a block diagram of an apparatus of transferring a monitor signal, in accordance with the fourth embodiment of the present invention.

FIG. 8 is a block diagram of an apparatus of transferring a monitor signal, in accordance with the fourth embodiment.

The apparatus is comprised of a signal input terminal 411 receiving an optical signal comprised of a primary signal having a wavelength of λ s which signal is multiplexed with a secondary signal having a wavelength of λ sv, a second optical branching filter 401 for branching the optical multiple signal transmitted through the signal input terminal 411, a second optical band-pass filter 402 to which the secondary signal separated in the second optical branching filter 401 is input, a photoelectric converter 403 which converts the optical signal transmitted from the second optical band-pass filter 402, into an electric signal, a monitor control signal processor 404 which processes the electric signal transmitted from the photoelectric converter 403, together with a monitor control signal input thereinto through a monitor control signal input terminal 413, a filter driver 405 receiving the monitor control signal transmitted from the monitor control signal processor 404 and controlling a later mentioned first optical band-pass filter 410 such that a primary wavelength among wavelengths of signals passing through the first optical band-pass filter 410 is equal to a wavelength λ sv of the secondary signal, a ring oscillator 420, a signal output terminal 412 optically connected to an output of the ring oscillator 420, and a second optical amplifier 406 optically connected in series between a later mentioned optical coupler 407 and the second optical branching filter 401.

The ring oscillator 420 is comprised of an optical coupler 407 to which the primary signal separated by the second optical branching filter 401 and amplified by the second optical amplifier 406 is input, a first optical branching filter 409 optically connected to the signal output terminal 412, a first optical amplifier 408 optically connected in series between the optical coupler 407 and the first optical branching filter 409, and a first optical band-pass filter 410 optically connected in series between the optical coupler 407 and the first optical branching filter 409, but optically connected in parallel with the first optical amplifier 408.

The second optical amplifier 406 is designed to have a narrower gain band width than that of the first optical amplifier 408.

The monitor-signal transferring apparatus in accordance with the fourth embodiment operates as follows.

Figure 9:
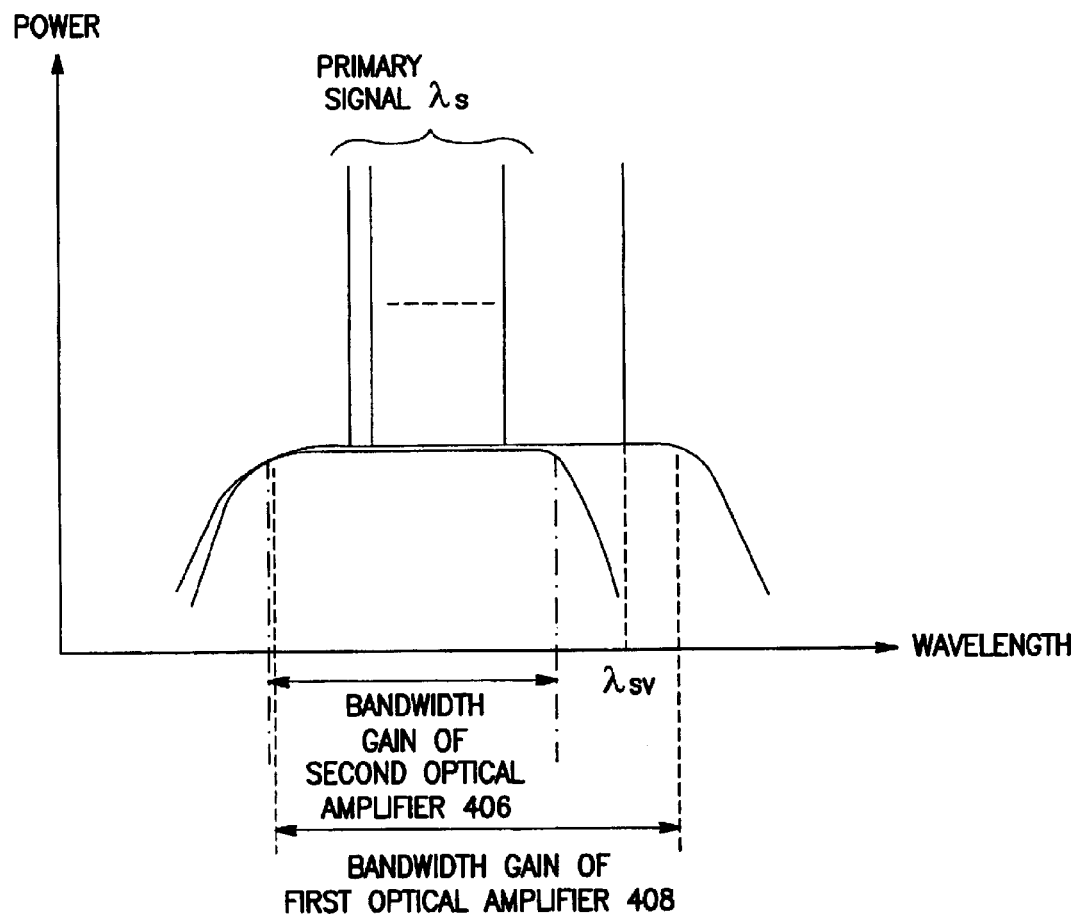
FIG. 9 is a graph showing a relation between a gain bandwidth of an optical amplifier and wavelengths λ s and λ sv of primary and secondary signals in the fourth embodiment.

An optical repeater is generally designed to be comprised of two optical amplifiers. FIG. 9 illustrates gain bandwidths of the first and second optical amplifiers 408 and 406. As is obvious in view of FIG. 9, the second optical amplifier 408 amplifies only the primary signal having a wavelength λ s, whereas the first optical amplifier 408 amplifies both the primary signal having a wavelength λ s and the secondary signal having a wavelength λ sv.

With reference to FIG. 8, the signal input terminal 411 receives an optical multiple signal in which the primary signal having a wavelength λ s is multiplexed with the secondary signal having a wavelength λ sv.

The optical multiple signal is divided into two parts in the second optical branching filter 401. The two parts are input into the second optical amplifier 406 and the second optical band-pass filter 402.

Since the secondary signal having a wavelength λ sv is out of a gain band width of the second optical amplifier 406, the second optical amplifier 406 act as a filter to the secondary signal having a wavelength λ sv. Accordingly, the secondary signal having a wavelength λ sv is not allowed to enter the second optical amplifier 406. As a result, only the primary signal having a wavelength λ s is amplified in the second optical amplifier 406, and then, transmitted to the optical coupler 407. The primary signal having a wavelength λ s is amplified again in the first optical amplifier 408, and transmitted to the signal output terminal 412 through the first optical branching filter 409.

At the same time when the primary signal is transmitted to the signal output terminal 412 through the first optical branching filter 409, a part of the primary signal is directed to the first optical band-pass filter 410 by the first optical branching filter 409. The part of the primary signal is input again into the first optical amplifier 408 through the first optical band-pass filter 408 and the optical coupler 407. That is, the ring oscillator 420 defines a fiber laser.

It is possible to have an output optical signal having a wavelength of λ sv, by setting a primary wavelength among wavelengths of signals passing through the first optical band-pass filter 410 to be equal to a wavelength λ sv of the secondary signal.

The primary signal in the optical multiple signal directed to the second optical band-pass filter 402 is not allowed to enter the second optical band-pass filter 402, and hence, only the secondary signal having a wavelength of λ sv passes through the second optical band-pass filter 402.

The secondary signal having a wavelength of λ sv having passed through the second optical band-pass filter 402 is input into the photoelectric converter 403, and is converted into an electric signal in the photoelectric converter 403.

The electric signal is processed in the monitor control signal processor 404 together with a monitor control signal input thereinto through the monitor control signal input terminal 413. The thus processed electric signal is transmitted into the filter driver 405 as a newly produced monitor control signal.

The filter driver 405 generates a such high-frequency signal that a primary wavelength among wavelengths of signals passing through the first optical band-pass filter 410 to be equal to a wavelength λ sv of the secondary signal, and controls on and off in transmission of the high-frequency signal to thereby modulate an intensity of the monitor control signal having the wavelength λ sv.

The conventional apparatus illustrated in FIG. 1 had to include the laser module 6 by the number equal to the number of the optical amplifiers 8. In contrast, the apparatus of transferring a monitor signal, in accordance with the fourth embodiment, makes it no longer necessary to include a laser module, ensuring simplification of a structure of the apparatus and reduction in fabrication cost.

In addition, since the second optical amplifier 406 is designed to have a narrower band than that of the first optical amplifier 408, it would be possible to use the second optical branching filter 401 which is cheaper than WDM filter, ensuring further reduction in fabrication cost.

[Fifth Embodiment]

Figure 10:
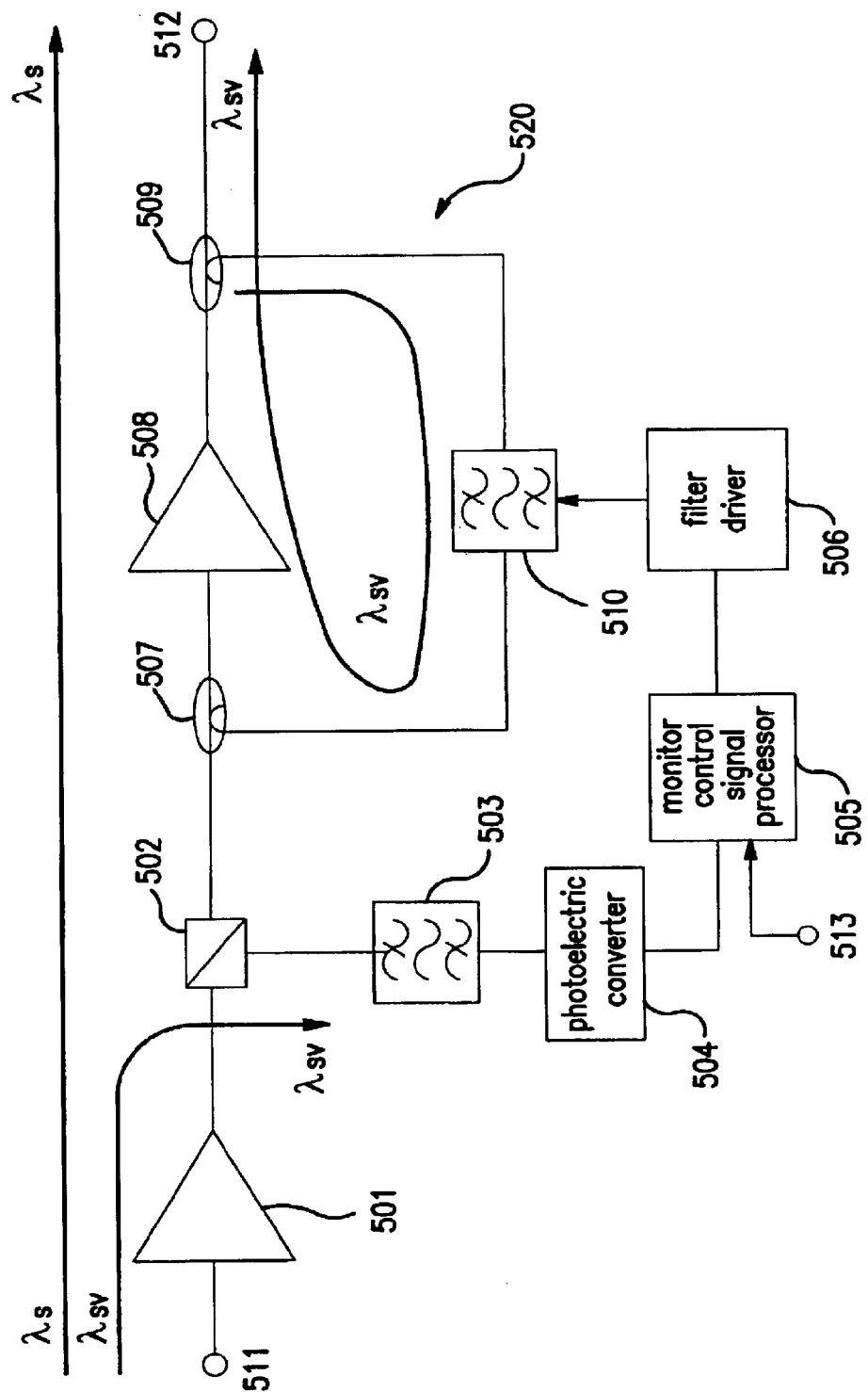
FIG. 10 is a block diagram of an apparatus of transferring a monitor signal, in accordance with the fifth embodiment of the present invention.

FIG. 10 is a block diagram of an apparatus of transferring a monitor signal, in accordance with the fifth embodiment.

The apparatus is comprised of a signal input terminal 511 receiving an optical signal comprised of a primary signal having a wavelength of $\lambda$ s which signal is multiplexed with a secondary signal having a wavelength of $\lambda$ sv, a second optical amplifier 501 optically connected to a signal input terminal 511, a wavelength division multiplex (WDM) filter 502 as a separator for separating the secondary signal from the optical multiple signal amplified by and transmitted from the second optical amplifier 501, a second optical band-pass filter 503 to which the secondary signal separated in the WDM filter 502 is input, a photoelectric converter 504 which converts the optical signal transmitted from the second optical band-pass filter 503, into an electric signal, a monitor control signal processor 505 which processes the electric signal transmitted from the photoelectric converter 504, together with a monitor control signal input thereinto through a monitor control signal input terminal 513, a filter driver 506 receiving the monitor control signal transmitted from the monitor control signal processor 505 and controlling a later mentioned first optical band-pass filter 510 such that a primary wavelength among wavelengths of signals passing through the first optical band-pass filter 510 is equal to a wavelength $\lambda$ sv of the secondary signal, a ring oscillator 520, and a signal output terminal 512 optically connected to an output of the ring oscillator 520.

The ring oscillator 520 is comprised of an optical coupler 507 to which the primary signal separated by the WDM filter 502 is input, a first optical branching filter 509 optically connected to the signal output terminal 512, a first optical amplifier 508 optically connected in series between the optical coupler 507 and the first optical branching filter 509, and a first optical band-pass filter 510 optically connected in series between the optical coupler 507 and the first optical branching filter 509, but optically connected in parallel with the first optical amplifier 508.

An optical repeater is generally designed to be comprised of two optical amplifiers. The second optical branching filter 406 is designed to have a narrower gain band width than that of the first optical branching filter 408 in the fourth embodiment, whereas the second optical branching filter 501 is designed to have the same gain band width as that of the first optical branching filter 508 in the fifth embodiment.

The monitor-signal transferring apparatus in accordance with the fifth embodiment operates as follows.

An optical multiple signal in which the primary signal having a wavelength of $\lambda$ s is multiplexed with the secondary signal having a wavelength of $\lambda$ sv is input into the WDM filter 502 through the signal input terminal 511.

The optical multiple signal is amplified in the second optical amplifier 501, and then, is separated into the primary and secondary signals in the WDM filter 502.

The primary signal having a wavelength of $\lambda$ s is input into the first optical amplifier 508 through the optical coupler 507 from the WDM filter 502, and amplified by the first optical amplifier 508. The thus amplified primary signal is output to the signal output terminal 512 through the first optical branching filter 509.

At the same time when the primary signal is transmitted to the signal output terminal 512 through the first optical branching filter 509, a part of the primary signal is directed to the first optical band-pass filter 510 by the first optical branching filter 509. The part of the primary signal is input again into the first optical amplifier 508 through the first optical band-pass filter 510 and the optical coupler 507. That is, the ring oscillator 520 defines a fiber laser.

It is possible to have an output optical signal having a wavelength of $\lambda$ sv, by setting a primary wavelength among wavelengths of signals passing through the first optical band-pass filter 510 to be equal to a wavelength $\lambda$ sv of the secondary signal.

The secondary signal having a wavelength of $\lambda$ sv, having been separated in WDM filter 502, is input into the photoelectric converter 504 through the second optical band-pass filter 503, and is converted into an electric signal in the photoelectric converter 504.

The electric signal is processed in the monitor control signal processor 505 together with a monitor control signal input thereinto through the monitor control signal input terminal 513. The thus processed electric signal is transmitted into the filter driver 506 as a newly produced monitor control signal.

The filter driver 506 generates a such high-frequency signal that a primary wavelength among wavelengths of signals passing through the first optical band-pass filter 510 to be equal to a wavelength $\lambda$ sv of the secondary signal, and controls on and off in transmission of the high-frequency signal to thereby modulate an intensity of the monitor control signal having the wavelength $\lambda$ sv.

The conventional apparatus illustrated in FIG. 1 had to include the laser module 6 by the number equal to the number of the optical amplifiers 8. In contrast, the apparatus of transferring a monitor signal, in accordance with the fifth embodiment, makes it no longer necessary to include a laser module, ensuring simplification of a structure of the apparatus and reduction in fabrication cost.

In addition, since the secondary signal having the wavelength $\lambda$ sv is amplified in the second optical amplifier 501, a receiver for receiving the secondary signal is not necessary to have high sensitivity, ensuring further reduction in fabrication cost.

[Sixth Embodiment]

Figure 11:
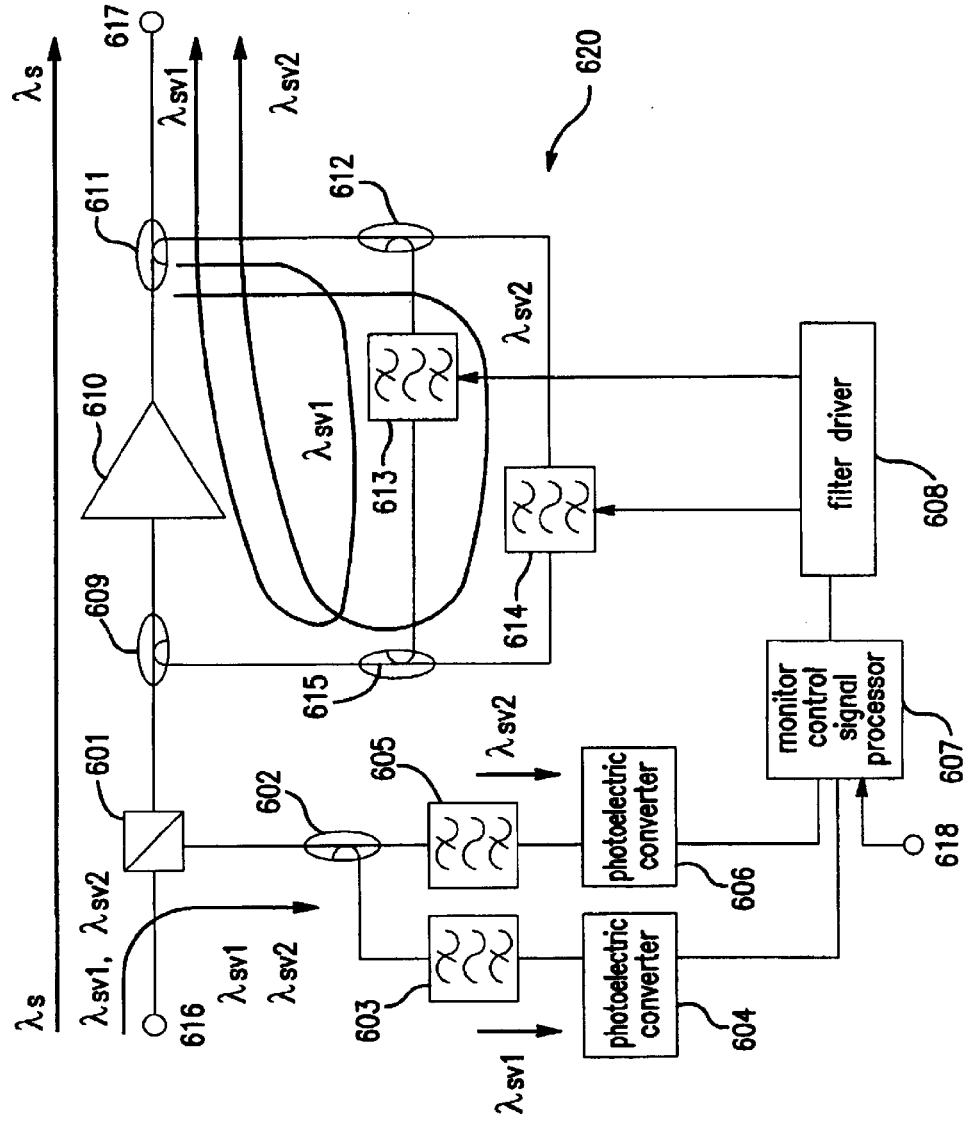
FIG. 11 is a block diagram of an apparatus of transferring a monitor signal, in accordance with the sixth embodiment of the present invention.

FIG. 11 is a block diagram of an apparatus of transferring a monitor signal, in accordance with the sixth embodiment.

The apparatus is comprised of a signal input terminal 616 receiving an optical multiple signal in which a primary signal having a wavelength of $\lambda$ s is multiplexed with a secondary signal having a wavelength of $\lambda$ sv, a wavelength division multiplex (WDM) filter 601 as a separator for separating secondary signals having wavelengths of $\lambda$ sv1 and $\lambda$ sv2, from the optical multiple signal transmitted through the signal input terminal 616, a third optical branching filter 602 receiving the secondary signals having wavelengths of $\lambda$ sv1 and $\lambda$ sv2 from WDM filter 601, adn separating the secondary signals into a main secondary signal having a wavelength of $\lambda$ sv1 and a subsidiary secondary signal having a wavelength of $\lambda$ sv2, a third optical band-pass filter 603 receiving the mainsecondary signal from the third optical branching filter 602, a fourth optical band-pass filter 605 receiving the sibsidiary secondary signal from the third optical branching filter 602, a first photoelectric converter 604 which converts the optical signal transmitted from the third optical band-pass filter 603, into an electric signal, a second photoelectric converter 606 which converts the optical signal transmitted from the fourth optical band-pass filter 605, into an electric signal, a monitor control signal processor 607 which processes the electric signal transmitted from the first and second photoelectric converters 604 and 606, together with a monitor control signal input thereinto through a monitor control signal input terminal 618, a filter driver 608 receiving the monitor control signal transmitted from the monitor control signal processor 607 and controlling later mentioned first and second optical band-pass filters 613 and 614 such that a primary wavelength among wavelengths of signals passing through the first and second optical band-pass filters 613 and 614 is equal to a wavelength λ sv of the secondary signal, a ring oscillator 620, and a signal output terminal 617 optically connected to an output of the ring oscillator 620.

The ring oscillator 620 is comprised of a first optical coupler 609 to which the primary signal separated by the WDM filter 601 is input, a first optical branching filter 611 optically connected to the signal output terminal 607, a first optical amplifier 610 optically connected in a series between the first optical coupler 609 and the first optical branching filter 611, a second optical branching filter 612 optically connected in series between the first optical coupler 609 and the first optical branching filter 611, but optically connected in parallel with the first optical amplifier 608, a second optical coupler 615 optically connected in series between the second optical branching filter 612 and the first optical coupler 609, a first optical band-pass filter 613 optically connected in series between the second optical branching filter 612 and the second optical coupler 615, and a second optical band-pass filter 614 optically connected in series between the second optical branching filter 612 and the second optical coupler 615, but optically connected in parallel with the first optical band-pass filter 613.

The monitor-signal transferring apparatus in accordance with the sixth embodiment operates as follows.

An optical multiple signal in which the primary signal having a wavelength of λ s is multiplexed with the secondary signal having wavelengths of λ sv1 and λ sv2 is input into the WDM filter 601 through the signal input terminal 616. The secondary signal has a redundant structure, that is, is comprised of a main secondary signal having a wavelength of λ sv1, to be mainly used, and a subsidiary secondary signal having a wavelength of λ sv2.

The optical multiple signal is separated into the primary and secondary signals in the WDM filter 601.

The primary signal having a wavelength of λ s is input into the first optical amplifier 610 through the first optical coupler 609 from the WDM filter 601, and amplified by the first optical amplifier 610. The thus amplified primary signal is output to the signal output terminal 617 through the first optical branching filter 611.

At the same time when the primary signal is transmitted to the signal output terminal 617 through the first optical branching filter 611, the primary signal is divided into two parts in the first optical branching filter 611, and one of the two parts is further divided into two parts in the second optical branching filter 612. The two parts divided in the second optical branching filter 612 pass through the first and second optical band-pass filters 613 and 614, and then, are input again into the first optical amplifier 610 through the second and first optical couplers 615 and 609. That is, the ring oscillator 620 defines a fiber laser.

It is possible to have an output optical signal having a wavelength of λ sv, by setting primary wavelengths among wavelengths of signals passing through the first and second optical band-pass filters 613 and 614 to be equal to wavelengths λ sv1 and λ sv2 of the main and subsidiary secondary signals, respectively.

The main and subsidiary secondary signals having wavelengths of λ sv1 and λ sv2, having been separated in WDM filter 601, are further separated in the third optical branching filter 602 into the main secondary signal having a wavelength λ sv1 and the subsidiary secondary signal having a wavelength λ sv2.

The main secondary signal having a wavelength λ sv1 is input into the first photoelectric converter 604 through the third. optical band-pass filter 603, and is converted into an electric signal in the first photoelectric converter 604. The subsidiary secondary signal having a wavelength λ sv2 is input into the second photoelectric converter 606 through the fourth optical band-pass filter 605, and is converted into an electric signal in the second photoelectric converter 606.

The electric signals are processed in the monitor control signal processor 607 together with a monitor control signal input thereinto through the monitor control signal input terminal 618. The thus processed electric signals are transmitted into the filter driver 608 as newly produced monitor control signals.

The filter driver 608 generates such high-frequency signals that a primary wavelength among wavelengths of signals passing through the first optical band-pass filter 613 to be equal to a wavelength λ sv1 of the main secondary signal, and that a primary wavelength among wavelengths of signals passing through the second optical band-pass filter 614 to be equal to a wavelength λ sv2 of the subsidiary secondary signal, and controls on and off in transmission of the high-frequency signals to thereby modulate intensities of the monitor control signals having the wavelength λ sv1 and λ sv2.

The conventional apparatus illustrated in FIG. 1 had to include the laser module 6 by the number equal to the number of the optical amplifiers 8. In contrast, the apparatus of transferring a monitor signal, in accordance with the sixth embodiment, makes it no longer necessary to include a laser module, ensuring simplification of a structure of the apparatus and reduction in fabrication cost.

In addition, since the secondary signal is designed to have a redundant structure, even if the secondary signal had a plurality of wavelengths, the secondary signal can be processed merely by adding optical band-pass filters in accordance with the increased number of wavelengths, which ensures reduction in fabrication cost of the apparatus.

Though the ring oscillator 620 is designed to include two optical band-pass filters 613 and 614 in the sixth embodiment, it should be noted that the number of the optical band-pass filters in the ring oscillator is not to be limited to two. The ring oscillator 620 may be designed to include three or more optical band-pass filters, in which case, the number of the optical band-pass filters to be optically connected to the third optical branching filter 602 is set equal to the number of the optical band-pass filters constituting the ring oscillator 620.

The above-mentioned second to fifth embodiments may be applied to the sixth embodiment as follows.

[Seventh through twelfth embodiments]

Figure 12:
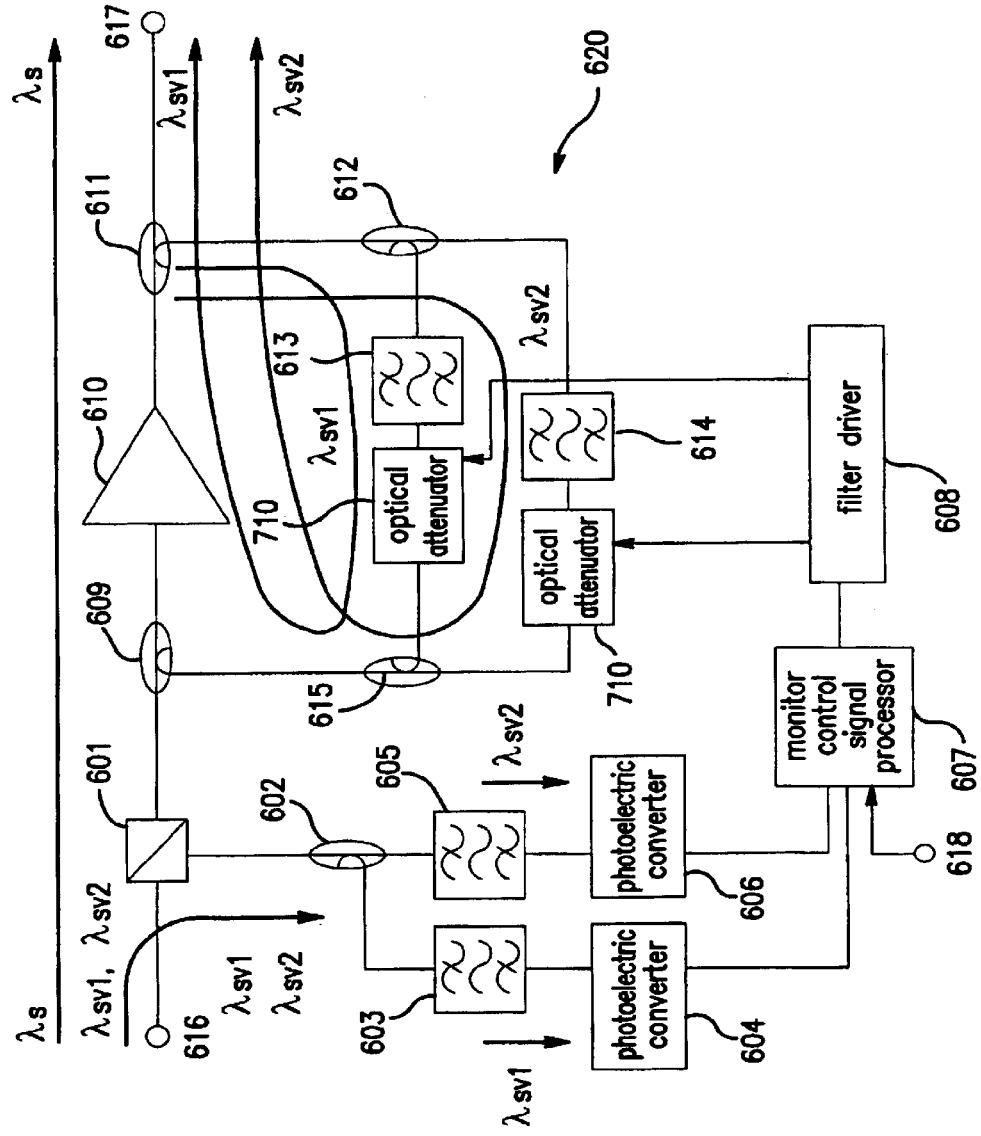
FIG. 12 is a block diagram of an apparatus of transferring a monitor signal, in accordance with the seventh embodiment of the present invention.

For instance, two optical attenuators 710 illustrated in FIG. 12 may be optically connected in series between the first and second optical band-pass filters 613 and 614, and the second optical coupler 615, respectively, in which case, the driver 608 drives those optical attenuators 710.

Figure 13:
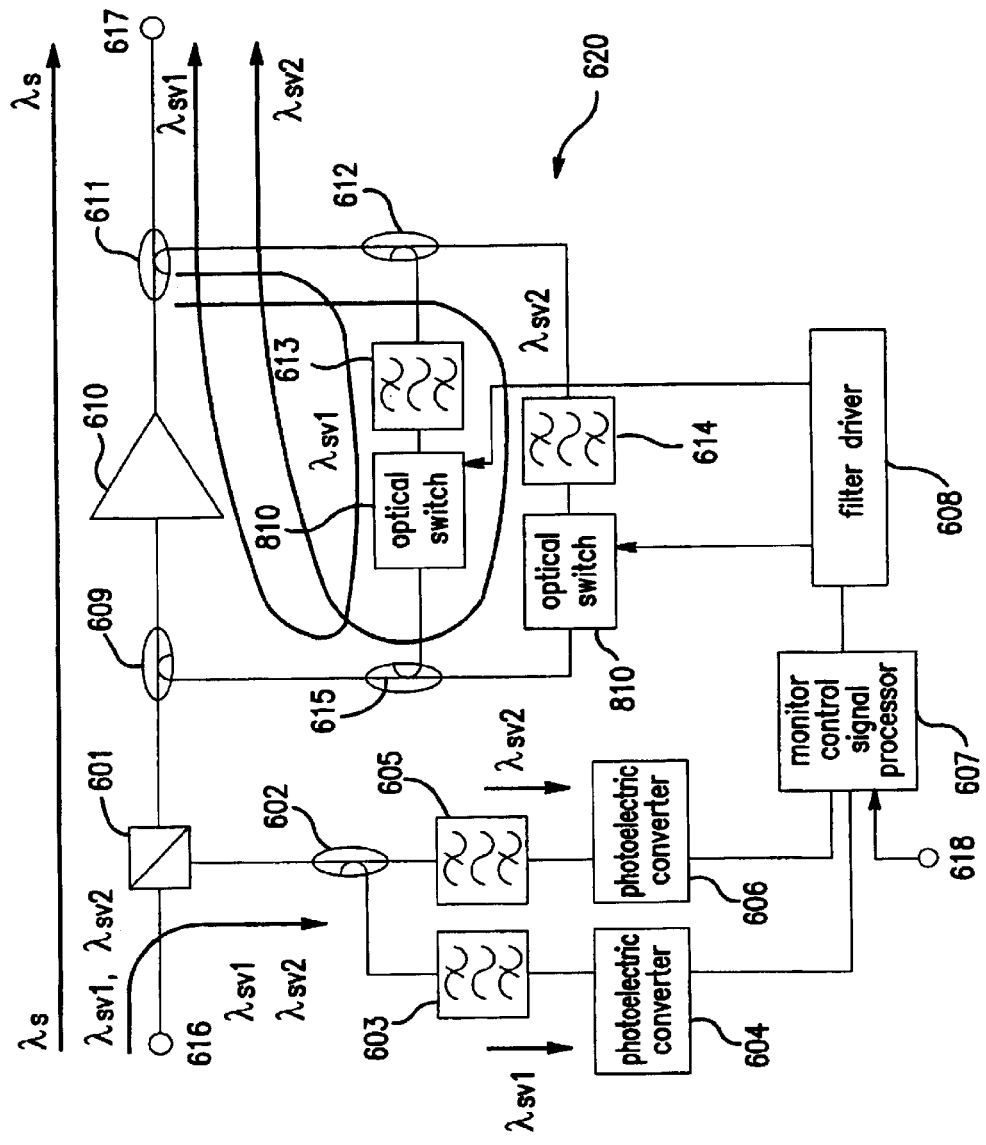
FIG. 13 is a block diagram of an apparatus of transferring a monitor signal, in accordance with the eighth embodiment of the present invention.

As an alternative, two optical switches 810 illustrated in FIG. 13 may be optically connected in series between the first and second optical band-pass filters 613 and 614, and the second optical coupler 615, respectively, in which case, the driver 608 drives those optical switches 810.

Figure 14:
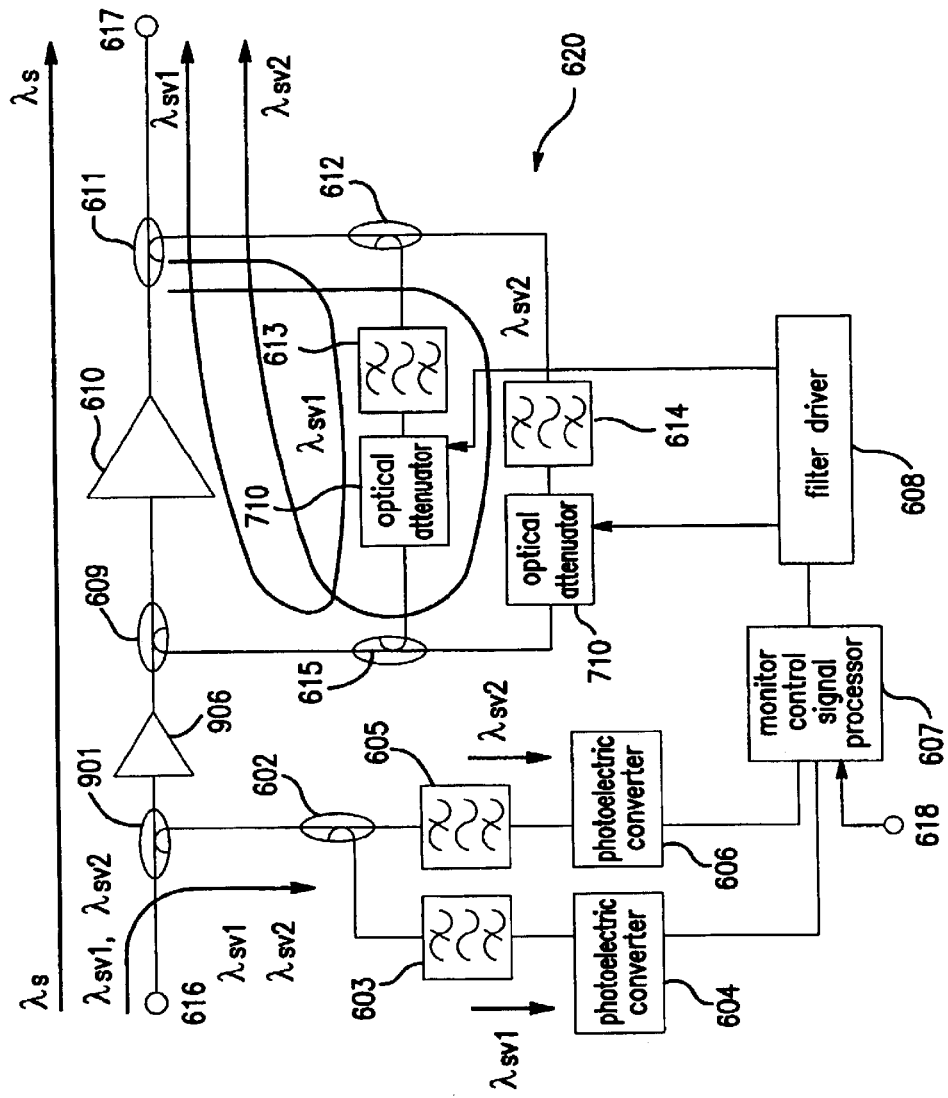
FIG. 14 is a block diagram of an apparatus of transferring a monitor signal, in accordance with the ninth embodiment of the present invention.
Figure 16:
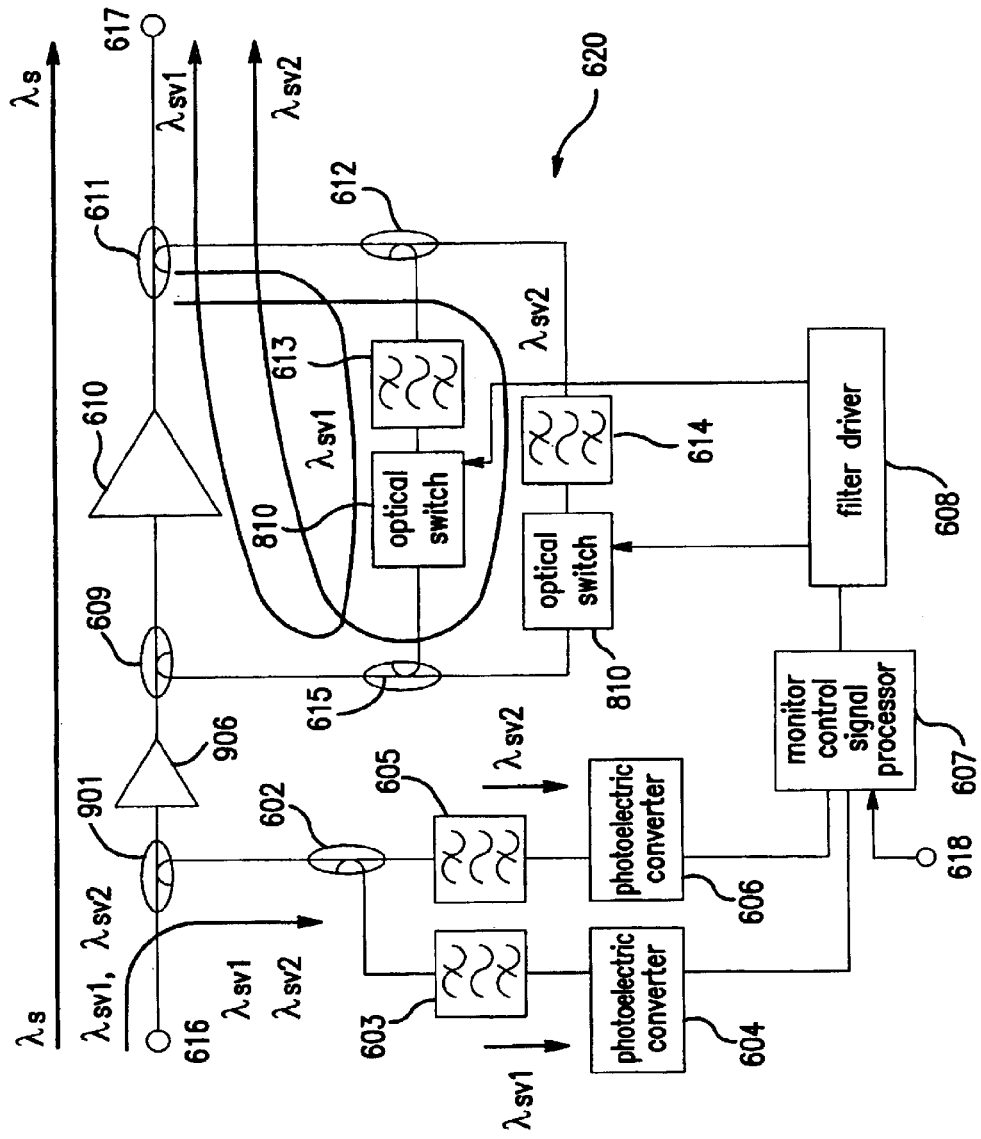
FIG. 16 is a block diagram of an apparatus of transferring a monitor signal, in accordance with the eleventh embodiment of the present invention.

Similarly to the fourth embodiment illustrated in FIG. 8, WDM filter 601 in the sixth embodiment may be replaced with an optical branching filter 901, and a second optical amplifier such as the optical amplifier 906 may be optically connected in series between the optical branching filter 901 and the first optical coupler 609 as shown in FIGS. 14 and 16.

Figure 15:
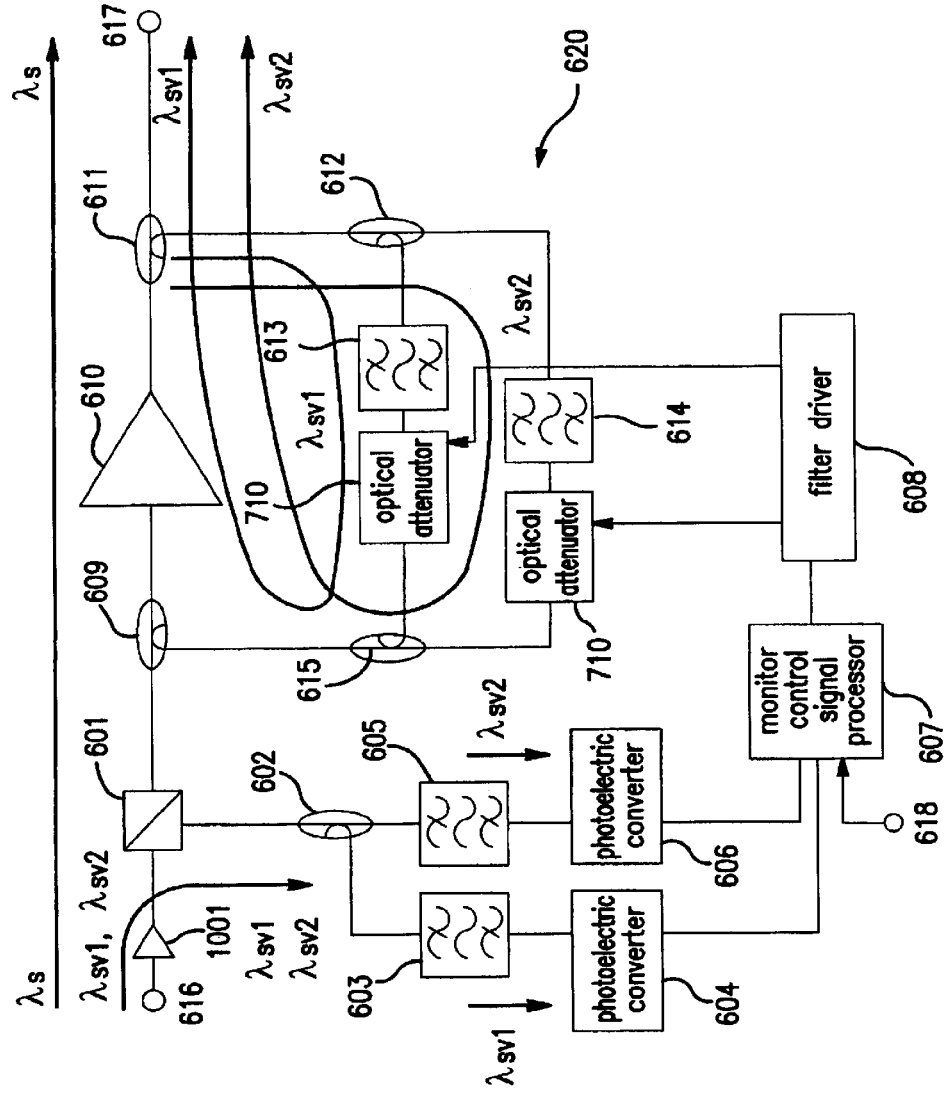
FIG. 15 is a block diagram of an apparatus of transferring a monitor signal, in accordance with the tenth embodiment of the present invention.
Figure 17:
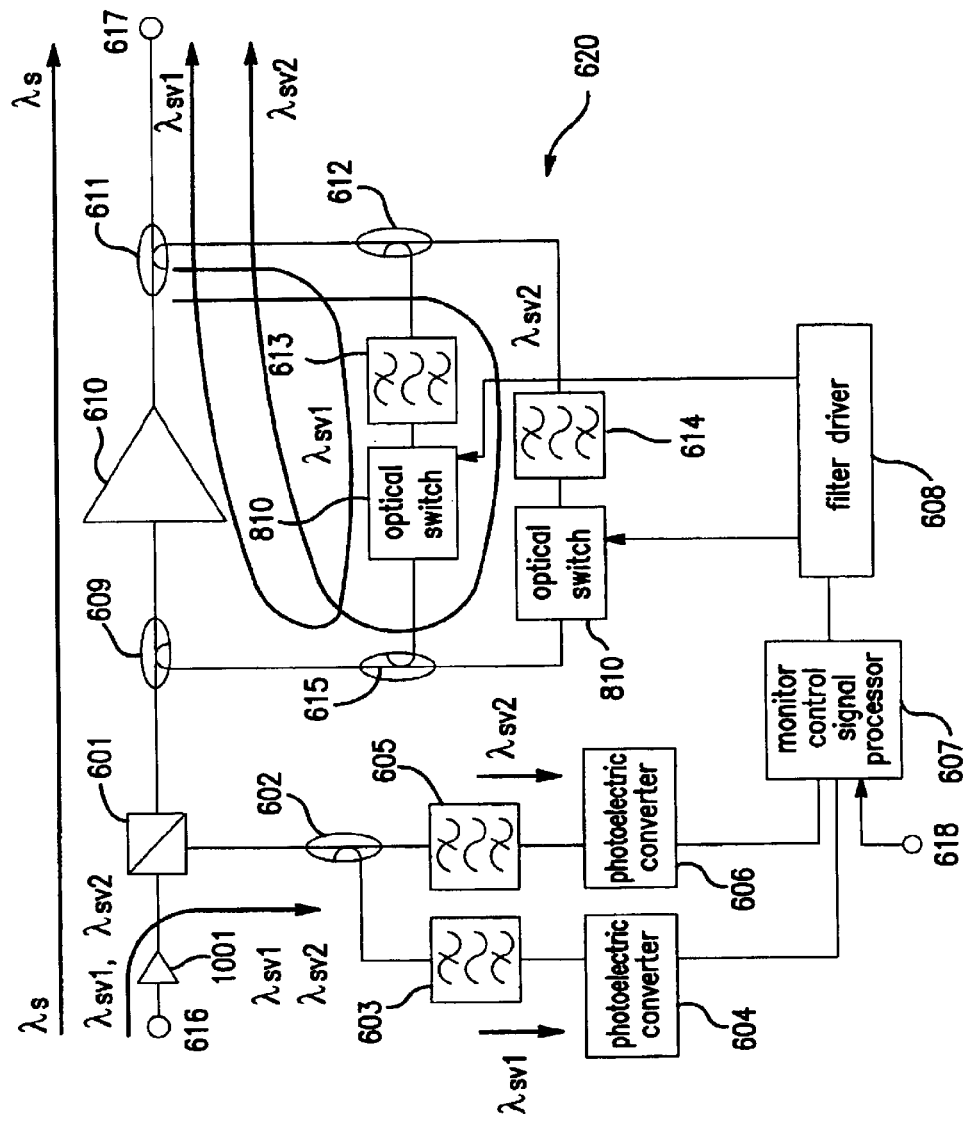
FIG. 17 is a block diagram of an apparatus of transferring a monitor signal, in accordance with the twelfth embodiment of the present invention.

Similarly to the fifth embodiment illustrated in FIG. 10, a second optical amplifier such as the optical amplifier 1001 may be optically connected in series between WDM filter 601 and the signal input terminal 616 as shown in FIGS. 15 and 17.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-126673 filed on May 7, 1999 including specification, claims, drawings and summary is incorporated herein by reference in its entirety.

What is claimed is:

1. An apparatus for transferring monitor signals, which apparatus receives a primary signal, and a secondary signal for monitoring a wavelength, and outputs said primary signal and a modulated secondary signal, said apparatus comprising:

a separator to which said primary and secondary signals are input and which separate said secondary signal from said primary signal;

a ring oscillator including an optical amplifier and a first optical band-pass filter, said ring oscillator oscillating wavelengths other than a wavelength of said primary signal in a range of a width of a gain band of said optical amplifier, to thereby modulate said secondary signal.

2. The apparatus as set forth in claim 1, further comprising:

a second optical band-pass filter to which said secondary signal separated by said separator is input;

a photoelectric converter optically connected to said second optical band-pass filter, said photoelectric converter converting an optical signal to an electric signal; and a filter driver receiving said electric signal and controlling said first optical band-pass filter such that a primary wavelength among wavelengths of signals passing through said first optical band-pass filter is equal to a wavelength of said secondary signal.

3. The apparatus as set forth in claim 2, wherein said filter driver varies passing loss in said first optical band-pass filter to thereby modulate an intensity of said secondary signal.

4. The apparatus as set forth in claim 1, wherein said first optical band-pass filter is comprised of an acoustic optical filter.

5. An apparatus for transferring monitor signals, which apparatus receives a primary signal, and a secondary signal for monitoring a wavelength, and outputs said primary signal and a modulated secondary signal, said apparatus comprising:

(a) an optical coupler to which said primary signal is input;

(b) a first optical branching filter optically connected to a signal output terminal;

(c) a first optical amplifier optically connected in series between said optical coupler and said first optical branching filter; and (d) a first optical band-pass filter optically connected in series between said optical coupler and said first optical branching filter, but optically connected in parallel with said first optical amplifier, said secondary signal is modulated and said modulated secondary signal being input into said first optical band-pass filter, said primary signal being input into said optical coupler and output from said signal output terminal through said first optical amplifier and said first optical branching filter, said primary signal being divided into two parts by said first optical branching filter, one of said two parts being input again into said first optical amplifier through said first optical band-pass filter and said optical coupler.

6. The apparatus as set forth in claim 5, further comprising a second optical amplifier for amplifying said primary signal, said second optical amplifier being located upstream of said first optical amplifier.

7. The apparatus as set forth in claim 6, wherein said second optical amplifier has a smaller gain band width than that of said first optical amplifier.

8. The apparatus as set forth in claim 5, further comprising a second optical amplifier for amplifying both said primary and secondary signals, said second optical amplifier being located upstream of said first optical amplifier.

9. The apparatus as set forth in claim 8, wherein said second optical amplifier has the same gain band width as that of said first optical amplifier.

10. The apparatus as set forth in claim 5, further comprising:

a separator to which said primary and secondary signals are input and which separate said secondary signal from said primary signal;

a second optical band-pass filter to which said secondary signal separated by said separator is input;

a photoelectric converter optically connected to said second optical band-pass filter, said photoelectric converter converting an optical signal to an electric signal; and a driver receiving said electric signal and controlling said first optical band-pass filter such that a primary wavelength among wavelengths of signals passing through said first optical band-pass filter is equal to a wavelength of said secondary signal.

11. The apparatus as set forth in claim 10, wherein said driver varies passing loss in said first optical band-pass filter to thereby modulate an intensity of said secondary signal.

12. The apparatus as set forth in claim 6, further comprising:

a branching filter which divides said primary and secondary signals into a plurality of signals;

a second optical band-pass filter to which at least one of said divided signals is input;

a photoelectric converter optically connected to said second optical band-pass filter, said photoelectric converter converting an optical signal to an electric signal; and a driver receiving said electric signal and controlling said first optical band-pass filter such that a primary wavelength among wavelengths of signals passing through said first optical band-pass filter is equal to a wavelength of said secondary signal.

13. The apparatus as set forth in claim 5, wherein said first optical band-pass filter is comprised of an acoustic optical filter.

14. An apparatus for transferring monitor signals, which apparatus receives a primary signal, and a secondary signal for monitoring a wavelength, and outputs said primary signal and a modulated secondary signal, said apparatus comprising:
(a) an optical coupler to which said primary signal is input;
(b) a first optical branching filter optically connected to a signal output terminal;
(c) a first optical amplifier optically connected in series between said optical coupler and said first optical branching filter;
(d) a first optical band-pass filter optically connected in series between said optical coupler and said first optical branching filter, but optically connected in parallel with said first optical amplifier; and
(e) an optical attenuator optically connected in series between said optical coupler and said first optical band-pass filter, said secondary signal is modulated and said modulated secondary signal being input into said optical attenuator, said primary signal being input into said optical coupler and output from said signal output terminal through said first optical amplifier and said first optical branching filter, said primary signal being divided into two parts by said first optical branching filter, one of said two parts being input again into said first optical amplifier through said first optical band-pass filter, said optical attenuator and said optical coupler.

15. The apparatus as set forth in claim 14, further comprising a second optical amplifier for amplifying said primary signal, said second optical amplifier being located upstream of said first optical amplifier.

16. The apparatus as set forth in claim 15, wherein said second optical amplifier has a smaller gain band width than that of said first optical amplifier.

17. The apparatus as set forth in claim 14, further comprising a second optical amplifier for amplifying both said primary and secondary signals, said second optical amplifier being located upstream of said first optical amplifier.

18. The apparatus as set forth in claim 17, wherein said second optical amplifier has the same gain band width as that of said first optical amplifier.

19. The apparatus as set forth in claim 14, further comprising:
a separator to which said primary and secondary signals are input and which separate said secondary signal from said primary signal;
a second optical band-pass filter to which said secondary signal separated by said separator is input;
a photoelectric converter optically connected to said second optical band-pass filter, said photoelectric converter converting an optical signal to an electric signal; and
a driver receiving said electric signal and controlling said optical attenuator such that a primary wavelength among wavelengths of signals passing through said optical attenuator is equal to a wavelength of said secondary signal.

20. The apparatus as set forth in claim 19, wherein said driver varies attenuation of said optical attenuator to thereby modulate an intensity of said secondary signal.

21. The apparatus as set forth in claim 14, further comprising:
a branching filter which divides said primary and secondary signals into a plurality of signals;
a second optical band-pass filter to which at least one of said divided signals is input;
a photoelectric converter optically connected to said second optical band-pass filter, said photoelectric converter converting an optical signal to an electric signal; and
a driver receiving said electric signal and controlling said optical attenuator such that a primary wavelength among wavelengths of signals passing through said optical attenuator is equal to a wavelength of said secondary signal.

22. The apparatus as set forth in claim 14, wherein said first optical band-pass filter is comprised of an acoustic optical filter.

23. An apparatus for transferring monitor signals, which apparatus receives a primary signal, and a secondary signal for monitoring a wavelength, and outputs said primary signal and a modulated secondary signal, said apparatus comprising:
(a) an optical coupler to which said primary signal is input;
(b) a first optical branching filter optically connected to a signal output terminal;
(c) a first optical amplifier optically connected in series between said optical coupler and said first optical branching filter;
(d) a first optical band-pass filter optically connected in series between said optical coupler and said first optical branching filter, but optically connected in parallel with said first optical amplifier; and
(e) an optical switch optically connected in series between said optical coupler and said first optical band-pass filter, said secondary signal is modulated and said modulated secondary signal being input into said optical switch, said primary signal being input into said optical coupler and output from said signal output terminal through said first optical amplifier and said first optical branching filter, said primary signal being divided into two parts by said first optical branching filter, one of said two parts being input again into said first optical amplifier through said first optical band-pass filter, said optical switch and said optical coupler.

24. The apparatus as set forth in claim 23, further comprising a second optical amplifier for amplifying said primary signal, said second optical amplifier being located upstream of said first optical amplifier.

25. The apparatus as set forth in claim 24, wherein said second optical amplifier has a smaller gain band width than that of said first optical amplifier.

26. The apparatus as set forth in claim 23, further comprising a second optical amplifier for amplifying both said primary and secondary signals, said second optical amplifier being located upstream of said first optical amplifier.

27. The apparatus as set forth in claim 26, wherein said second optical amplifier has the same gain band width as that of said first optical amplifier.

28. The apparatus as set forth in claim 23, further comprising:
a separator to which said primary and secondary signals are input and which separate said secondary signal from said primary signal;

a second optical band-pass filter to which said secondary signal separated by said separator is input;

a photoelectric converter optically connected to said second optical band-pass filter, said photoelectric converter converting an optical signal to an electric signal; and a driver receiving said electric signal and controlling said optical switch such that a primary wavelength among wavelengths of signals passing through said optical switch is equal to a wavelength of said secondary signal.

29. The apparatus as set forth in claim 28, wherein said driver turns said optical switch on or off to thereby modulate an intensity of said secondary signal.

30. The apparatus as set forth in claim 24, further comprising:

a branching filter which divides said primary and secondary signals into a plurality of signals;

a second optical band-pass filter to which at least one of said divided signals is input;

a photoelectric converter optically connected to said second optical band-pass filter, said photoelectric converter converting an optical signal to an electric signal; and a driver receiving said electric signal and controlling said optical switch such that a primary wavelength among wavelengths of signals passing through said optical switch is equal to a wavelength of said secondary signal.

31. The apparatus as set forth in claim 23, wherein said first optical band-pass filter is comprised of an acoustic optical filter.

32. An apparatus for transferring monitor signals, which apparatus receives a primary signal, and a secondary signal for monitoring a wavelength, and outputs said primary signal and a modulated secondary signal, said apparatus comprising:

(a) a first optical coupler to which said primary signal is input;

(b) a first optical branching filter optically connected to a signal output terminal;

(c) a first optical amplifier optically connected in series between said first optical coupler and said first optical branching filter;

(d) a second optical branching filter optically connected in series between said first optical coupler and said first optical branching filter, but optically connected in parallel with said first optical amplifier;

(e) a second optical coupler optically connected in series between said second optical branching filter and said first optical coupler; and (f) first to N-th optical band-pass filters optically connected in series between said second optical branching filter and said second optical coupler, and optically connected in parallel with one another wherein N is an integer equal to or greater than 2, said secondary signal is modulated and said modulated secondary signal being input into said first-to-nth optical band-pass filters, said primary signal being input into said first optical coupler and output from said signal output terminal through said first optical amplifier and said first optical branching filter, said primary signal being divided into two parts by said first optical branching filter, one of said two parts being input again into said first optical amplifier through said second optical branching filter, said first to N-th optical band-pass filters and said second optical coupler.

33. The apparatus as set forth in claim 32, further comprising a second optical amplifier for amplifying said primary signal, said second optical amplifier being located upstream of said first optical amplifier.

34. The apparatus as set forth in claim 33, wherein said second optical amplifier has a smaller gain band width than that of said first optical amplifier.

35. The apparatus as set forth in claim 32, further comprising a second optical amplifier for amplifying both said primary and secondary signals, said second optical amplifier being located upstream of said first optical amplifier.

36. The apparatus as set forth in claim 35, wherein said second optical amplifier has the same gain band width as that of said first optical amplifier.

37. The apparatus as set forth in claim 32, further comprising:

a separator to which said primary and secondary signals are input and which separate said secondary signal from said primary signal;

a third branching filter to which said secondary signal separated by said separator is input and which divides the thus input secondary signal into N signals;

N optical band-pass filters to each of which each of said N signals is input;

N photoelectric converters each optically connected to each of said N optical band-pass filters, said photoelectric converter converting an optical signal to an electric signal; and a driver receiving said electric signals and controlling said first to N-th optical band-pass filters such that a primary wavelength among wavelengths of signals passing through each of said first to N-th optical band-pass filters is equal to a wavelength of each of said N signals.

38. The apparatus as set forth in claim 37, wherein said driver varies passing loss in each of said first to N-th optical band-pass filters to thereby modulate an intensity of each of said N signals.

39. The apparatus as set forth in claim 32, further comprising:

a fourth branching filter which divides said primary and secondary signals into a plurality of signals;

a third branching filter to which said secondary signal divided by said fourth branching filter is input and which divides the thus input secondary signal into N signals;

N optical band-pass filters to each of which each of said N signals is input;

a photoelectric converter optically connected to each of said N optical band-pass filters, said photoelectric converter converting an optical signal to an electric signal; and a driver receiving said electric signals and controlling said first to N-th optical band-pass filters such that a primary wavelength among wavelengths of signals passing through each of said first to N-th optical band-pass filters is equal to a wavelength of each of said N signals.

40. The apparatus as set forth in claim 32, wherein said first optical band-pass filter is comprised of an acoustic optical filter.

41. An apparatus for transferring monitor signals, which apparatus receives a primary signal, and a secondary signal for monitoring a wavelength, and outputs said primary signal and a modulated secondary signal, said apparatus comprising:

(a) a first optical coupler to which said primary signal is input;

(b) a first optical branching filter optically connected to a signal output terminal;

(c) a first optical amplifier optically connected in series between said first optical coupler and said first optical branching filter;

(d) a second optical branching filter optically connected in series between said first optical coupler and said first optical branching filter, but optically connected in parallel with said first optical amplifier;

(e) a second optical coupler optically connected in series between said second optical branching filter and said first optical coupler;

(f) first to N-th optical band-pass filters optically connected in series between said second optical branching filter and said second optical coupler, and optically connected in parallel with one another wherein N is an integer equal to or greater than 2; and (g) an optical attenuator optically connected in series between said second optical coupler and said first to N-th optical band-pass filters, said secondary signal is modulated and said modulated secondary signal being input into said optical attenuator, said primary signal being input into said first optical coupler and output from said signal output terminal through said first optical amplifier and said first optical branching filter, said primary signal being divided into two parts by said first optical branching filter, one of said two parts being input again into said first optical amplifier through said second optical branching filter, said first to N-th optical band-pass filters, said optical attenuator and said second optical coupler.

42. The apparatus as set forth in claim 41, further comprising a second optical amplifier for amplifying said primary signal, said second optical amplifier being located upstream of said first optical amplifier.

43. The apparatus as set forth in claim 42, wherein said second optical amplifier has a smaller gain band width than that of said first optical amplifier.

44. The apparatus as set forth in claim 41, further comprising a second optical amplifier for amplifying both said primary and secondary signals, said second optical amplifier being located upstream of said first optical amplifier.

45. The apparatus as set forth in claim 44, wherein said second optical amplifier has the same gain band width as that of said first optical amplifier.

46. The apparatus as set forth in claim 41, further comprising:

a separator to which said primary and secondary signals are input and which separate said secondary signal from said primary signal;

a third branching filter to which said secondary signal separated by said separator is input and which divides the thus input secondary signal into N signals;

N optical band-pass filters to each of which each of said N signals is input;

N photoelectric converters each optically connected to each of said N optical band-pass filters, said photoelectric converter converting an optical signal to an electric signal; and a driver receiving said electric signals and controlling said optical attenuator such that a primary wavelength among wavelengths of signals passing through each of said first to N-th optical band-pass filters is equal to a wavelength of each of said N signals.

47. The apparatus as set forth in claim 46, wherein said driver varies attenuation of said optical attenuator to thereby modulate an intensity of said secondary signal.

48. The apparatus as set forth in claim 41, further comprising:

a fourth branching filter which divides said primary and secondary signals into a plurality of signals;

a third branching filter to which said secondary signal divided by said fourth branching filter is input and which divides the thus input secondary signal into N signals;

N optical band-pass filters to each of which each of said N signals is input;

a photoelectric converter optically connected to each of said N optical band-pass filters, said photoelectric converter converting an optical signal to an electric signal; and a driver receiving said electric signals and controlling said optical attenuator such that a primary wavelength among wavelengths of signals passing through each of said first to N-th optical band-pass filters is equal to a wavelength of each-of said N signals.

49. The apparatus as set forth in claim 41, wherein said first optical band-pass filter is comprised of an acoustic optical filter.

50. An apparatus for transferring monitor signals, which apparatus receives a primary signal, and a secondary signal for monitoring a wavelength, and outputs said primary signal and a modulated secondary signal, said apparatus comprising:

(a) a first optical coupler to which said primary signal is input;

(b) a first optical branching filter optically connected to a signal output terminal;

(c) a first optical amplifier optically connected in series between said first optical coupler and said first optical branching filter;

(d) a second optical branching filter optically connected in series between said first optical coupler and said first optical branching filter, but optically connected in parallel with said first optical amplifier;

(e) a second optical coupler optically connected in series between said second optical branching filter and said first optical coupler;

(f) first to N-th optical band-pass filters optically connected in series between said second optical branching filter and said second optical coupler, and optically connected in parallel with one another wherein N is an integer equal to or greater than 2; and (g) an optical switch optically connected in series between said second optical coupler and said first to N-th optical band-pass filters, said secondary signal is modulated and said modulated secondary signal being input into said optical switch, said primary signal being input into said first optical coupler and output from said signal output terminal through said first optical amplifier and said first optical branching filter, said primary signal being divided into two parts by said first optical branching filter, one of said two parts being input again into said first optical amplifier through said second optical branching filter, said first to N-th optical band-pass filters, said optical switch and said second optical coupler.

51. The apparatus as set forth in claim 50, further comprising a second optical amplifier for amplifying said primary signal, said second optical amplifier being located upstream of said first optical amplifier.

52. The apparatus as set forth in claim 51, wherein said second optical amplifier has a smaller gain band width than that of said first optical amplifier.

53. The apparatus as set forth in claim 50, further comprising a second optical amplifier for amplifying both said primary and secondary signals, said second optical amplifier being located upstream of said first optical amplifier.

54. The apparatus as set forth in claim 53, wherein said second optical amplifier has the same gain band width as that of said first optical amplifier.

55. The apparatus as set forth in claim 50, further comprising:
- a separator to which said primary and secondary signals are input and which separate said secondary signal from said primary signal;
- a third branching filter to which said secondary signal separated by said separator is input and which divides the thus input secondary signal into N signals;
- N optical band-pass filters to each of which each of said N signals is input;
- N photoelectric converters each optically connected to each of said N optical band-pass filters, said photoelectric converter converting an optical signal to an electric signal; and
- a driver receiving said electric signals and controlling said optical switch such that a primary wavelength among wavelengths of signals passing through each of said first to N-th optical band-pass filters is equal to a wavelength of each of said N signals.

56. The apparatus as set forth in claim 55, wherein said driver turns said optical switch on or off to thereby modulate an intensity of said secondary signal.

57. The apparatus as set forth in claim 50, further comprising:
- a fourth branching filter which divides said primary and secondary signals into a plurality of signals;
- a third branching filter to which said secondary signal divided by said fourth branching filter is input and which divides the thus input secondary signal into N signals;
- N optical band-pass filters to each of which each of said N signals is input;
- a photoelectric converter optically connected to each of said N optical band-pass filters, said photoelectric converter converting an optical signal to an electric signal; and
- a driver receiving said electric signals and controlling said optical switch such that a primary wavelength among wavelengths of signals passing through each of said first to N-th optical band-pass filters is equal to a wavelength of each of said N signals.

58. The apparatus as set forth in claim 50, wherein said first optical band-pass filter is comprised of an acoustic optical filter.

\* \* \* \* \*